US009078077B2

(12) United States Patent
Hultz et al.

(10) Patent No.: US 9,078,077 B2
(45) **Date of Patent: *Jul. 7, 2015**

(54) ESTIMATION OF SYNTHETIC AUDIO PROTOTYPES WITH FREQUENCY-BASED INPUT SIGNAL DECOMPOSITION

(75) Inventors: Paul B. Hultz, Brookline, NH (US); Tobe Barksdale, Bolton, MA (US); Michael Dublin, Cambridge, MA (US); Luke C. Walters, Miami, FL (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,758

(22) Filed: Oct. 21, 2011

(65) Prior Publication Data

US 2012/0099739 A1 Apr. 26, 2012

Related U.S. Application Data

(63) Continuation-in-part of application No. 12/909,569, filed on Oct. 21, 2010.

(51) Int. Cl.
*H04R 5/00* (2006.01)
*H04B 1/00* (2006.01)
*H04S 3/02* (2006.01)
*H04S 3/00* (2006.01)

(52) U.S. Cl.
CPC ............... *H04S 3/02* (2013.01); *H04R 2499/13* (2013.01); *H04S 3/008* (2013.01); *H04S 2400/05* (2013.01); *H04S 2400/15* (2013.01); *H04S 2420/07* (2013.01)

(58) Field of Classification Search
USPC .................................. 381/17, 92, 119, 18, 27
See application file for complete search history.

(56) References Cited

U.S. PATENT DOCUMENTS

| | | | |
|---|---|---|---|
| 3,969,588 | A | 7/1976 | Raydon et al. |
| 4,066,842 | A | 1/1978 | Allen |
| 4,455,675 | A | 6/1984 | Bose |
| 4,485,484 | A | 11/1984 | Flanegan |
| 4,653,102 | A | 3/1987 | Hansen |
| 4,731,847 | A | 3/1988 | Lybrook et al. |

(Continued)

FOREIGN PATENT DOCUMENTS

| | | |
|---|---|---|
| CN | 1261759 | 8/2000 |
| CN | 1998265 | 7/2007 |

(Continued)

OTHER PUBLICATIONS

Webster's New World Dictionary, Third College Edition, p. 465, 1988.*

(Continued)

*Primary Examiner* — Ahmad F Matar
*Assistant Examiner* — Katherine Faley
(74) *Attorney, Agent, or Firm* — Fish & Richardson P.C.

(57) ABSTRACT

An approach to forming output signals both permits flexible and temporally and/or frequency local processing of input signals while limiting or mitigating artifacts in such output signals. Generally, the approach involves first synthesizing prototype signals for the output signals, or equivalently characterizing such prototypes, for example, according to their statistical characteristics, and then forming the output signals as estimates of the prototype signals, for example, as weighted combinations of the input signals.

22 Claims, 18 Drawing Sheets

(56) References Cited

U.S. PATENT DOCUMENTS

| | | | | |
|---|---|---|---|---|
| 4,904,078 | A | | 2/1990 | Gorike |
| 5,051,964 | A | | 9/1991 | Sasaki |
| 5,109,417 | A | | 4/1992 | Fielder et al. |
| 5,181,252 | A | | 1/1993 | Sapiejewski et al. |
| 5,197,098 | A | | 3/1993 | Drapeau |
| 5,197,099 | A | | 3/1993 | Hirasawa |
| 5,197,100 | A | | 3/1993 | Shiraki |
| 5,265,166 | A | | 11/1993 | Madnick et al. |
| 5,291,557 | A | | 3/1994 | Davis et al. |
| 5,315,532 | A | | 5/1994 | Comon |
| 5,341,457 | A | | 8/1994 | Hall, II et al. |
| 5,479,522 | A | | 12/1995 | Lindemann et al. |
| 5,550,924 | A | | 8/1996 | Helf et al. |
| 5,651,071 | A | | 7/1997 | Lindemann et al. |
| 5,757,937 | A | | 5/1998 | Itoh et al. |
| 5,778,082 | A | | 7/1998 | Chu et al. |
| 5,815,582 | A | | 9/1998 | Claybaugh et al. |
| 5,901,232 | A | | 5/1999 | Gibbs |
| 6,002,776 | A | | 12/1999 | Bhadkamkar et al. |
| 6,137,887 | A | | 10/2000 | Anderson |
| 6,198,830 | B1 | | 3/2001 | Holube et al. |
| 6,222,927 | B1 | | 4/2001 | Feng et al. |
| 6,317,703 | B1 | | 11/2001 | Linsker |
| 6,321,200 | B1 | | 11/2001 | Casey |
| 6,549,630 | B1 | | 4/2003 | Bobisuthi |
| 6,594,365 | B1 | | 7/2003 | Eatwell |
| 6,704,428 | B1 | | 3/2004 | Wurtz |
| 6,708,146 | B1 | * | 3/2004 | Sewall et al. ................. 704/217 |
| 6,823,176 | B2 | | 11/2004 | Rogers |
| 6,888,945 | B2 | | 5/2005 | Horrall |
| 6,912,178 | B2 | | 6/2005 | Chu et al. |
| 6,978,159 | B2 | | 12/2005 | Feng et al. |
| 6,983,055 | B2 | | 1/2006 | Luo |
| 6,987,856 | B1 | | 1/2006 | Feng et al. |
| 7,013,015 | B2 | | 3/2006 | Hohmann et al. |
| 7,065,219 | B1 | | 6/2006 | Abe et al. |
| 7,346,175 | B2 | | 3/2008 | Hui et al. |
| 7,359,520 | B2 | | 4/2008 | Brennan et al. |
| 152,155 | A1 | | 6/2008 | Avendano et al. |
| 7,593,535 | B2 | | 9/2009 | Shmunk |
| 7,630,500 | B1 | * | 12/2009 | Beckman et al. ............... 381/18 |
| 8,116,459 | B2 | | 2/2012 | Disch et al. |
| 8,611,554 | B2 | | 12/2013 | Short et al. |
| 8,675,881 | B2 | | 3/2014 | Hultz et al. |
| 8,767,975 | B2 | | 7/2014 | Short |
| 2002/0150261 | A1 | | 10/2002 | Moeller et al. |
| 2003/0002692 | A1 | | 1/2003 | McKitrick et al. |
| 2003/0091199 | A1 | | 5/2003 | Horrall et al. |
| 2003/0228023 | A1 | | 12/2003 | Burnett et al. |
| 2004/0125922 | A1 | | 7/2004 | Specht |
| 2004/0179699 | A1 | | 9/2004 | Moeller et al. |
| 2005/0232440 | A1 | | 10/2005 | Roovers |
| 2005/0249361 | A1 | | 11/2005 | Beavis et al. |
| 2005/0276419 | A1 | | 12/2005 | Eggert et al. |
| 2006/0013409 | A1 | | 1/2006 | Desloge |
| 2006/0045294 | A1 | | 3/2006 | Smyth |
| 2006/0050898 | A1 | | 3/2006 | Yamada et al. |
| 2006/0109983 | A1 | | 5/2006 | Young et al. |
| 2007/0050176 | A1 | | 3/2007 | Taenzer et al. |
| 2007/0253569 | A1 | | 11/2007 | Bose |
| 2008/0013762 | A1 | | 1/2008 | Roeck et al. |
| 2008/0112574 | A1 | | 5/2008 | Brennan et al. |
| 2008/0170718 | A1 | | 7/2008 | Faller |
| 2008/0317260 | A1 | | 12/2008 | Short |
| 2009/0067642 | A1 | | 3/2009 | Buck et al. |
| 2009/0110203 | A1 | | 4/2009 | Taleb |
| 2009/0222272 | A1 | * | 9/2009 | Seefeldt et al. ............... 704/500 |
| 2009/0252341 | A1 | | 10/2009 | Goodwin |
| 2009/0262969 | A1 | | 10/2009 | Short et al. |
| 2011/0013790 | A1 | * | 1/2011 | Hilpert et al. ................. 381/300 |
| 2011/0238425 | A1 | | 9/2011 | Neuendorf et al. |
| 2011/0305352 | A1 | | 12/2011 | Villemoes et al. |
| 2012/0039477 | A1 | | 2/2012 | Schijers et al. |

FOREIGN PATENT DOCUMENTS

| | | |
|---|---|---|
| CN | 101410889 | 4/2009 |
| EP | 1489596 | 12/2004 |
| EP | 1600791 | 11/2005 |
| EP | 1 374 399 | 12/2005 |
| EP | 1 853 093 | 11/2007 |
| GB | 806261 | 12/1958 |
| GB | 2394589 | 4/2004 |
| JP | 06-233388 | 8/1994 |
| JP | 2000-270391 | 9/2000 |
| JP | 2002-095084 | 3/2002 |
| JP | 2004-289762 | 10/2004 |
| JP | 2004334218 | 11/2004 |
| JP | 2006-267444 | 10/2006 |
| JP | 2007036608 | 2/2007 |
| JP | 2007/135046 | 5/2007 |
| JP | 2008507926 | 3/2008 |
| JP | 2009-531724 | 9/2009 |
| WO | 2006/026812 | 3/2006 |
| WO | 2006028587 | 3/2006 |
| WO | 2007137365 | 12/2007 |
| WO | 2008/155708 | 12/2008 |

OTHER PUBLICATIONS

Christof Faller "Multiple-Loudspeaker Playback of Stereo Signals". J. Audio Eng. Soc., vol. 54, No. 11, Nov. 2006, pp. 1051-1064.

"SP-1 Spatial Sound Processor"; Spatial Sound Inc., 1990.

Olson. Harry F, Directional Microphones, Journal of the Audio Engineering Society; pp. 420-430, Oct. 1967.

Shulman. Uri, Shue Brothers, Inc. Reducint Off-Axis Comb Filter Effects in Highly Directional Microphones, Presented at the 81st Convention Nov. 12-16, 1986, Los Angeles, CA, 2405 (D-19); pp. 1-9.

Wittkop, Two-channel noise redaction algorithms motivated by models of binaural interaction, Sep. 9, 1968, Hamburg, Germany. Chapter 3, pp. 39-59.

B. Kollmeier, et. aL Binaural Noise-Reduction Hearing Aid Scheme with Real-Time Processing in the Frequency Domain, Scand Audio11993; Suppl 38: 28-38. From the Drittes Physikatisches Institut der Unviersitat Gottingen, Burgerstr. 42-44, W-3400 Gotlingen, FR Germany.

M Nilsson, Ph.D., Sonic Innovations, Salt Lake City, Utah Topic: Sonic Innovations new product—Innova 2128/2005, http:/www.aodiologyonline.com/interview/displayarchives.asp?interviewid=324.

Aarabi, Phase-Based Dual-Microphone Robust Speech Enhancement, IEEE Transactions on Systems, Man, and Cybernetics—Part B: Cybernetics, vol. 34, No. 4, Aug. 2004, pp. 1763-1773.

P. Bloom, Evaluation of Two Jnput Speech Dereverberation Techniques, Division of Engineering Polytechnic of Ceniral London, London W1M 8JS, England. CH 1746-7/82/0000-0164 $00.75 © 1982 IEEE, pp. 164-167.

Baard, Frames with baked-in hearing aides, Apr. 17, 2006, http://wwwboston_com/business/personaltech/articles/2006/D4/17/frames_with_baked_in_hearing_ai . . . , Downloaded Apr. 19, 2006.

Aarabi, Post Recognition Speech Localization, International Journal of Speech Technology 8. 173-160, 2005, Springer Science + Business Media, Inc. Manufactured in The Netherlands, pp. 173-180.

V. Hamacher, et al., Signal Processing in High-End Hearing Aids: State of the Art, Challenges, and Future Trends, EURASIP Joumal on Applied Signal Processing 2005:18, 2915-2929 © 2005 V. Hamaeher.

Mungamura, et el, Enhanced Sound Localization, IEEE Transactions on Systems, Man, and Cybemetics—Part B: Cybernetics, vol. 34, No. 3, Jun. 2004, 1083-4419/04$20.00 © 2004 IEEE, pp. 1526-1540.

Aarabi, MIT's Magazine of Innovation Technology Review, Oct. 2005, USDA, www.technology review.com, p. 42.

Wittkop, etal, Strategy-selective noise reduction for binaural digital hearing aides, NH Elsevier, Speech Communication 39 (2003) 111-138, www.elsevier.com/located/specom, Medizinische Physik, Universitat Oldenburg, D26111, Germany, Copyright 2002.

(56) References Cited

OTHER PUBLICATIONS

B. Kollmeier, et al. Binaural Noise-Reduction Hearing Aid Scheme with Real-Time Processing in the Frequency Domain, Scand Audiol1993; Suppl. 38; 28-38.

International Report on Patentability dated Nov. 4, 2010, for PCT/US2009/037503, 7 pages.

Canetto, B., et al: "Speech Enhancement Systems Based on Microphone Arrays" 20020527; 20020527-20020531,May 27, 2002, pp. 1-9, XP007905367.

International Search Report and Written Opinion dated Aug. 12, 2008 for PCT/US08/064056.

International Preliminary Report on Patentability dated Sep. 16, 2009 for PCT/US08/064056.

International Search Report and Written Opinion dated Jun. 23, 2009 issued in International Application No. PCT/US2009/037503.

Fortschritt-Berichtevdi, DipL Phys. Jurgen Peissign, Gott]ngen, Binaurale Horgeratestrategien in komplexen Storschallsituationen, Reihe 17: Biotechnik, copyright 1993. See Concise Explanation of the Relevance of "Strategies for Binaural Hearing Aids in Complex Sound Fields".

Bai, et al., Microphone array signal processing with application in three-dimensional spatial hearing, Acoustical Society of America, pp. 2112-2121, copyright 2005.

Chinese Office Action dated Jan. 24, 2013 for Appln. No. 200980113532.3.

Beranek, Leo L.; "Acoustics", Published for the Acoustical Society of America by the American Institute of Physics; 1954, 1986.

Japanese Office Action dated Jun. 25, 2013 for JP 2012-073301.

Chinese Office Action dated Jul. 31, 2013 for CN Appln. No. 200980113532.3.

File history of U.S. Patent No. 7,630,500.

File history of U.S. Patent No. 8,611,554.

File history of U.S. Patent No. 8,767,975.

Office action mailed Dec. 16, 2014 in corresponding Japanese application No. 2013-535119, 5 pp. (both original and English-language translation).

File History of U.S. Patent No. 8,675,881 (downloaded Feb. 12, 2015).

First Office Action; CN Appl. No. 201180050792.8; Oct. 10, 2014; 19 pp (English-language translation).

Machine translation of CN 101410889; 44 pp.

* cited by examiner

800

ESTIMATION OF SYNTHETIC AUDIO PROTOTYPES WITH FREQUENCY-BASED INPUT SIGNAL DECOMPOSITION

CROSS-REFERENCE TO RELATED APPLICATIONS

This application is a continuation-in-part (CIP) of the following application, which is incorporated herein by reference:

U.S. application Ser. No. 12/909,569, filed on Oct. 21, 2010.

This application is related to, but does not claim the benefit of the filing dates of, the following applications, which are incorporated herein by reference:

U.S. Pat. No. 7,630,500, titled "Spatial Disassembly Process," issued on Dec. 8, 2009; and U.S. Patent Pub. 2009/0262969, titled "Hearing Assistance Apparatus," published on Oct. 22, 2009.

U.S. Patent Pub. 2008/0317260, titled "Sound Discrimination Method and Apparatus," published on Dec. 25, 2008.

BACKGROUND

This invention relates to estimation of synthetic audio prototypes.

In the field of audio signal processing, the term "upmixing" generally refers to the process of undoing "downmixing", which is the addition of many source signals into fewer audio channels. Downmixing can be a natural acoustic process, or a studio combination. As an example, upmixing can involve producing a number of spatially separated audio channels from a multichannel source.

The simplest upmixer takes in a stereo pair of audio signals and generates a single output representing the information common to both channels, which is usually referred to as the center channel. A slightly more complex upmixer might generate three channels, representing the center channel and the "not center" components of the left and right inputs. More complex upmixers attempt to separate one or more center channels, two "side-only" channels of panned content, and one or more "surround" channels of uncorrelated or out of phase content.

One method of upmixing is performed in the time domain by creating weighted (sometimes negative) combinations of stereo input channels. This method can render a single source in a desired location, but it may not allow multiple simultaneous sources to be isolated. For example, a time domain upmixer operating on stereo content that is dominated by common (center) content will mix panned and poorly correlated content into the center output channel even though this weaker content belongs in other channels.

A number of stereo upmixing algorithms are commercially available, including Dolby Pro Logic II (and variants), Lexicon's Logic 7 and DTS Neo:6, Bose's Videostage, Audio Stage, Centerpoint, and Centerpoint II.

There is a need to perform upmixing in a manner that accurately renders spatially separated audio channels from a multichannel source in a manner that reduces sonic artifacts and has low processing latency.

SUMMARY

One or more embodiments address a technical problem of synthesizing output signals that both permit flexible and temporal and/or frequency local processing while limiting or mitigating artifacts in such output signals. Generally, this technical problem can be addressed by first synthesizing prototype signals for the output signals (or equivalently signals and/or data characterizing such prototypes, for example, according to their statistical characteristics), and then forming the output signals as estimates of the prototype signals, for example, formed as weighted combinations of the input signals. In some examples, the prototypes are nonlinear functions of the inputs and the estimates are formed according to a least squared error metric.

This technical problem can arise in a variety of audio processing applications. For instance, the process of upmixing from a set of input audio channels can be addressed by first forming the prototypes for the upmixed signals, and then estimating the output signals to most closely match the prototypes using combinations of the input signals. Other applications include signal enhancement with multiple microphone inputs, for example, to provide directionality and/or ambient noise mitigation in a headset, handheld microphone, in-vehicle microphone, etc., that have multiple microphone elements.

In one aspect, in general, a method for forming output signals from a plurality of input signals includes determining a characterization of a synthesis of one or more prototype signals from multiple of the input signals. One or more output signals are formed, including forming each output signal as an estimate of a corresponding one of the one or more prototype signals comprising a combination of one or more of the input signals.

Aspects may include one or more of the following features.

Determining the characterization of the synthesis of the prototype signals includes determining the prototype signals, or includes determining statistical characteristics of the prototype signals.

Determining the characterization of a synthesis of prototype signal includes forming said data based on a temporally local analysis of the input signals. In some examples, determining the characterization of a synthesis of prototype signal further includes forming said data based on a frequency local analysis of the input signals. In some examples, the forming of the estimate of the prototype is based on a more global analysis of the input and prototype signals than the local analysis in forming the prototype signal.

The synthesis of a prototype signal includes a non-linear function of the input signals and/or a gating of one or more of the input signals.

Forming the output signal as an estimate of the prototype includes forming minimum error estimate of the prototype. In some examples, forming the minimum error estimate comprises forming a least-squared error estimate.

Forming the output signal as an estimate of a corresponding one of the one or more prototype signals, as a combination of one or more of the input signals, including computing estimates of statistics relating the prototype signal and the one or more input signals, and determining a weighting coefficient to apply to each of said input signals.

The statistics include cross power statistics between the prototype signal and the one or more input signals, auto power statistics of the one or more input signals, and cross power statistics between all of input signals, if there is more than one.

Computing the estimates of the statistics includes averaging locally computed statistics over time and/or frequency.

The method further comprises decomposing each input signal into a plurality of components Determining the data characterizing the synthesis of the prototype signals includes forming data characterizing component decompositions of each prototype signal into a plurality of prototype components.

Forming each output signal as an estimate of a corresponding one of the prototype signals includes forming a plurality of output component estimates as transformations of corresponding components of one or more input signals Forming the output signals includes combining the formed output component estimates to form the output signals.

Forming the component decomposition includes forming a frequency-based decomposition.

Forming the component decomposition includes forming a substantially orthogonal decomposition.

Forming the component decomposition includes applying at least one of a Wavelet transform, a uniform bandwidth filter bank, a non-uniform bandwidth filter bank, a quadrature mirror filterbank, and a statistical decomposition.

Forming a plurality of output component estimates as combination of correspond components of one or more input signals comprises scaling the components of the input signals to form the components of the output signals.

The input signals comprise multiple input audio channels of an audio recording, and wherein the output signals comprise additional upmixed channels. In some examples, the multiple input audio channels comprise at least a left audio channel and a right audio channel, and wherein the additional upmixed channels comprise at least one of a center channel and a surround channel.

The plurality of input signals is accepted from a microphone array. In some examples, the one or more prototype signals are synthesized according to differences among the input signals. In some examples, the prototype signal is formed according differences among the input signals includes determining a gating value according to gain and/or phase differences and the gating value is applied to one or more of the input signals to determine the prototype signal.

In another aspect, in general, a method for forming one or more output signals from a plurality of input signals includes decomposing the input signals into input signal components representing different frequency components (e.g., components that are generally frequency dependent) at each of a series of times. A characterization of one or more prototype signals is determined, for instance, from multiple of the input signals. The characterization of the one or more prototype signals comprising a plurality of prototype components representing different frequency components at each of the series of time. One or more output signals are then formed by forming each output signal as an estimate of a corresponding one of the one or more prototype signals comprising a combination of one or more of the input signals.

In some examples, forming the output signal as an estimate of a prototype signal comprises, for each of a plurality of prototype components, forming an estimate as a combination of multiple of the input signal components, for instance, including at least some input signal components at a different time or a different frequency than the prototype component being estimated.

In some examples, forming the output signal as an estimate of a prototype signal comprises applying one or more constraints in determining the combination of the one or more of the input signals.

In another aspect, in general, a system for processing a plurality of input signals to form an output as an estimate of a synthetic prototype signal is configured to perform all the steps of any of the methods specified above.

In another aspect, in general, software, which may be embodied on a machine-readable medium, includes instructions for processing a plurality of input signals to form an output as an estimate of a synthetic prototype signal is configured to perform all the steps of any of the methods specified above.

In another aspect in general, a system for processing a plurality of input signals comprises a prototype generator configured to accept multiple of the input signals and to provide a characterization of a prototype signal. An estimator is configured to accept the characterization of the prototype signal and to form an output signal as an estimate of the prototype signal as a combination of one or more of the input signals.

Aspects can include one or more of the following features.

The prototype signal comprises a non-linear function of the input signals.

The estimate of the prototype signal comprises a least squared error estimate of the prototype signal.

The system includes a component analysis module for forming a multiple component decomposition of each of the input signals, and a reconstruction module for reconstructing the output signal from a component decomposition of the output signal.

The prototype generator and the estimator are each configured to operate on a component by component basis.

The prototype generator is configured, for each component, to perform a temporally local processing of the input signals to determine a characterization of a component of the prototype signal.

The prototype generator is configured to accept multiple input audio channels, and wherein the estimator is configured to provide an output signal comprising an additional upmixed channel.

The prototype generator is configured to accept multiple input audio channels from a microphone array, and wherein the prototype generator is configured to synthesize one or more prototype signals according to differences among the input signals.

An upmixing process may include converting the input signals to a component representation (e.g., by using a DFT filter bank). A component representation of each signal may be created periodically over time, thereby adding a time dimension to the component representation (e.g., a time-frequency representation).

Some embodiments may use heuristics to nonlinearly estimate a desired output signal as a prototype signal. For example, a heuristic can determine how much of a given component from each of the input signals to include in an output signal.

The results that can be achieved by nonlinearly generating coefficients (i.e., nonlinear prototypes) independently across time and frequency can be satisfactory when a suitable filter bank is employed.

Approximation techniques (e.g., least-squares approximation) may be used to project the nonlinear prototypes onto the input signal space, thereby determining upmixing coefficients. The upmixing coefficients can be used to mix the input signals into the desired output signals.

Smoothing may be used to reduce artifacts and resolution requirements but may slow down the response time of existing upmixing systems. Existing time-frequency upmixers require difficult trade-offs to be made between artifacts and responsiveness. Creating linear estimates of synthesized prototypes makes these trade-offs less severe.

Embodiments may have one or more of the following advantages.

The nonlinear processing techniques used in the present application offer the possibility to perform a wide range of transforms that might not otherwise be possible by using linear processing techniques alone. For example, upmixing, modification of room acoustics, and signal selection (e.g., for telephone headsets and hearing aids) can be accomplished using nonlinear processing techniques without introducing objectionable artifacts.

Linear estimation of nonlinear prototypes of target signals allows systems to quickly respond to changes in input signals while introducing a minimal number of artifacts.

Other features and advantages of the invention are apparent from the following description, and from the claims.

DESCRIPTION

1 System Overview

Figure 1:
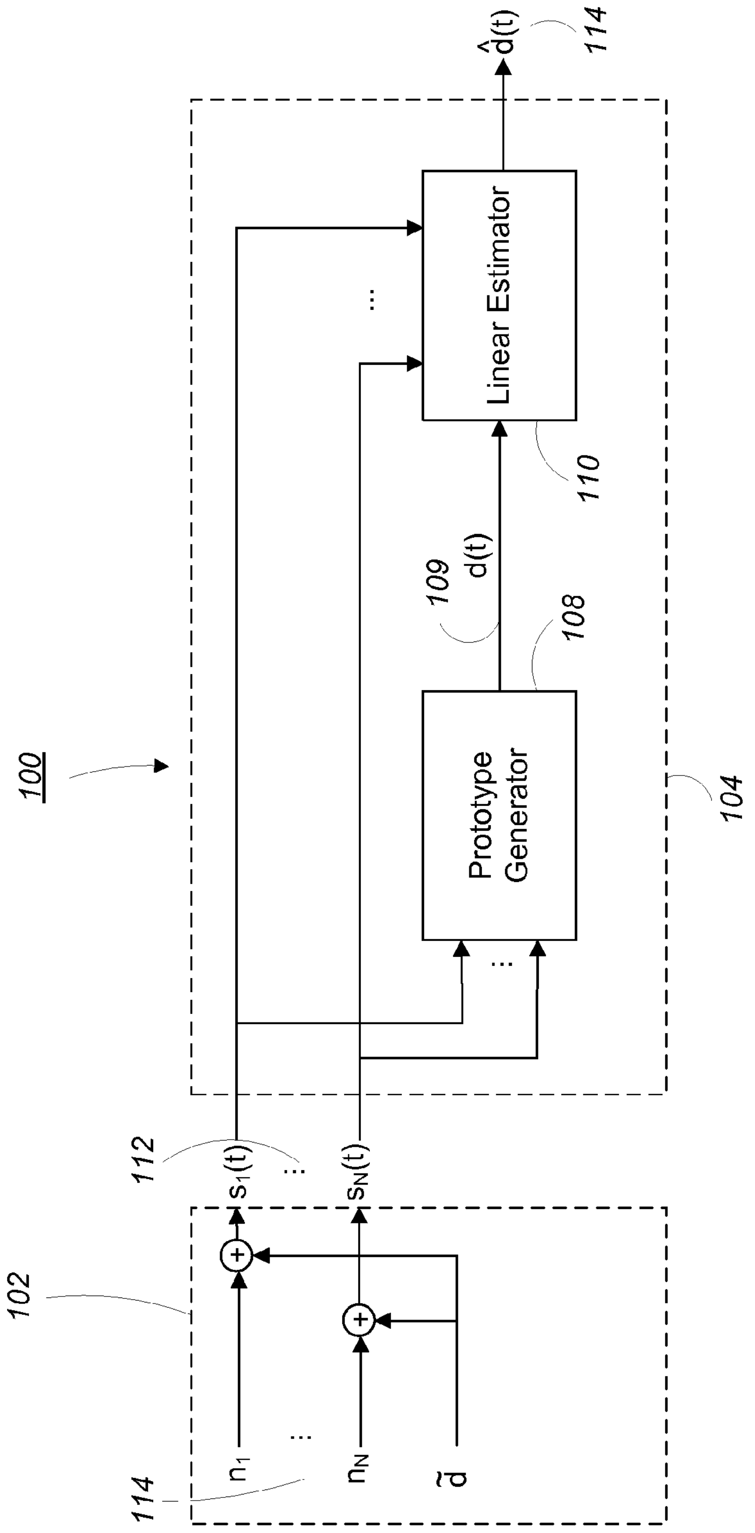
FIG. 1 is a block diagram of a system configured for linear estimation of synthetic prototypes.

Referring to FIG. 1, an example of a system that makes use of estimation of synthetic prototypes is an upmixing system 100 that includes an upmix module 104, which accepts input signals 112 $s_1(t), \ldots, s_N(t)$ and outputs an upmixed signal $\hat{d}(t)$. As an example, input time signals $s_1(t)$ and $s_2(t)$ represent left and right input signals, and $\hat{d}(t)$ represents a derived center channel. The upmix module 104 forms the upmixed signal $\hat{d}(t)$ as a combination of the input signals $s_1(t), \ldots, s_N(t)$ 112, for instance as a (time varying) linear combination of the input signals. Generally, the upmixed signal $\hat{d}(t)$ is formed by an estimator 110 as a linear estimate of the prototype signal d(t) 109, which is formed from the input signals by a prototype generator 108, generally by a non-linear technique. In some examples, the estimate is formed as a linear (e.g., frequency weighted) combination of the input signals that best approximates the prototype signal in a minimum mean-squared error sense. This linear estimate $\hat{d}(t)$ is generally based on a generative model 102 for the set of input signals 112 as being formed as a combination of an obscured target signal $\tilde{d}(t)$ and noise components 114 each associated with one of the input signal 112.

In the system 100 shown in FIG. 1, a synthetic prototype generation module 108 forms the prototype d(t) 109 as non-linear transformations of the set of input signals 112. It should be recognized that the prototype can also be formed using linear techniques, as an example, with the prototype being formed from a different subset of the input signals than is used to estimate the output signal from the prototype. For certain types of prototype generation, the prototype may include degradation and/or artifacts that would produce low quality audio output if presented directly to a listener without passing through the linear estimator 110. As introduced above, in some examples, the prototype d(t) is associated with a desired upmixing of input signals. In other examples, the prototype is formed for other purposes, for example, based on an identification of a desired signal in the presence of interference.

In some embodiments, the process of forming the prototype signal is more localized in time and/or frequency than is the estimation process, which may introduce a degree of smoothness that can compensate for unpleasant characteristics in the prototype signal resulting from the localized processing. On the other hand, the local nature of the prototype generation provides a degree of flexibility and control that enables forms of processing (e.g., upmixing) that are otherwise unattainable.

2 Component Decomposition

In some implementations, the upmixing module 104 of the upmixing system 100 illustrated in FIG. 1 is implemented by breaking each input signal 112 into components (e.g., frequency bands) and processing each component individually. For example, in the case of orthogonal components, the linear estimator 110 can be implemented by independently forming an estimate of each orthogonal component, and then synthesizing the output signal from the estimated components. It should be understood that although the description below focuses on components formed as frequency bands of the input signals, other decompositions into orthogonal or substantially independent components may be equivalently used. Such alternative decomposition may include Wavelet transform of the input signals, non-uniform (e.g., psychoacoustic critical bands; octaves) filter banks, perceptual component decomposition, quadrature mirror filterbanks, statistical (e.g., principal components) based decompositions, etc.

Figure 2:
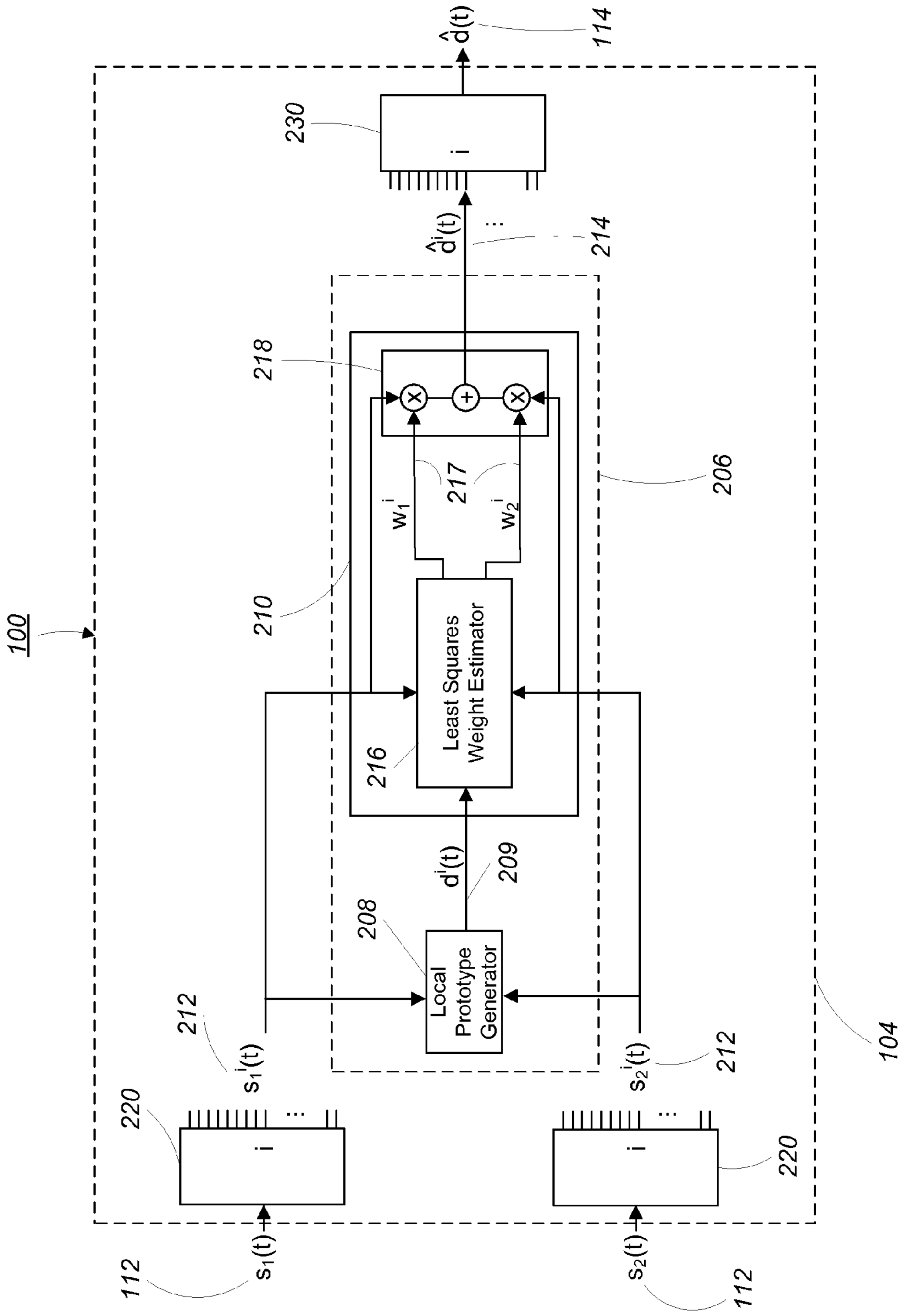
FIG. 2 is a block diagram of the decomposition of signals into components and estimation of a synthetic prototype for a representative component.

Referring to FIG. 2, one embodiment of an upmixing module 104 is configured to process decompositions of the input signals (in this example two input signals) in a manner similar to that described in U.S. Pat. No. 7,630,500, titled "Spatial Disassembly Process," which is incorporated herein by reference. Each of the input signals 112 is transformed into a multiple component representation with individual components 212. For instance, the input signal $s_1(t)$ is decomposed into a set of components $s_1^i(t)$ indexed by i. In some examples, and as described in the above-referenced patent, component analyzer 220 is a discrete Fourier transform (DFT) analysis filter bank that transforms the input signals into frequency components. In some examples, the frequency components are outputs of zero-phase filters, each with an equal bandwidth (e.g., 125 Hz).

The output signal $\hat{d}(t)$ is reconstructed from a set of components $\hat{d}^i(t)$ using a reconstruction module 230. The component analyzers 220 and the reconstruction module 230 are such that if the components are passed through without modification, the originally analyzed signal is essentially (i.e., not necessarily perfectly) reproduced at the output of the reconstruction module 230.

In some embodiments, the component analyzer 220 windows the input signals 112 into time blocks of equal size, which may be indexed by n. The blocks may overlap (i.e., part of the data of one block may also be contained in another block), such that each window is shifted in time by a "hop size" $\tau$. As an example, a windowing function (e.g., square root Hanning window) may be applied to each block for the purpose of improving the resulting component representations 222. Following applying the windowing function to the blocks, the component analyzer 220 may zero pad each block of the input signals 112 and then decompose each zero padded block into their respective component representations. In some embodiments, the components 212 form base band signals, each modulated by a center frequency (i.e., by a complex exponential) of the respective center frequencies of the filter bands. Furthermore each component 212 may be downsampled and processed at a lower sampling rate sufficient for the bandwidth of the filter bands. For example, the output of a DFT filter bank band-pass filter with a 125 Hz bandwidth may be sampled at 250 Hz without violating the Nyquist criterion.

In some examples, the input signals are sampled at 44.1 KHz, and shifted into frames of length 23.2 ms., or 1024 samples, that are selected at a frame hop period of $\tau$=11.6 ms, or 512 samples. Each frame is multiplicatively windowed by a window function of $\sin(\pi\cdot\tau)/\tau$, where t=0 indexes the beginning of the frame. The windowed frame forms the input to a 1024_point FFT. Each frequency component is formed from one output of the FFT. (Other windows may be chosen that are shorter of longer than the input length of the FFT. If the input window is shorter than the FFT, the data can be zero-extended to fit the FFT; if the input window is longer than the FFT, the data can be time-aliased.)

In FIG. 2, the windowing of the input signals, and the subsequent overlap adding of the output signals is not illustrated. Therefore, the figure should be understood as explicitly illustrating the processing of a single analysis window. More precisely, given the continuous input signal $s_k(t)$, for the $n^{th}$ analysis window, a windowed signal $s_{k,[n]}(t)=s_k(t)w(t-n\tau)$ is formed, where the window may be defined as $w(t)=\sin(\pi\cdot t)/\tau$ These windowed signals are shown without subscripts [n] in FIG. 2. The components of a signal are then defined to decompose each signal as $$s_{k,[n]}(t) = \sum_i s^i_{k,[n]}(t)e^{j\omega_i t}.$$

The resulting output signals $\hat{d}(t)$ for the analysis periods are then combined as $\hat{d}(t)=\Sigma_n \hat{d}_{[n]}(t)w(t-n\tau)$.

3 Prototype Synthesis

As introduced above, one approach to synthesis of prototype signals is on a component-by-component basis, and in particular in a component-local basis such that each component for each window period is processed separately to form one or more prototypes for that local component.

In FIG. 2, a component upmixer 206 processes a single pair of input components, $s_1^i(t)$ and $s_2^i(t)$ to form an output component $\hat{d}^i(t)$. The component upmixer 206 includes a component-based local prototype generator 208 which determines a prototype signal component $d^i(t)$ (typically at the downsampled rate) from the input components $s_1^i(t)$ and $s_2(t)$. In general, the prototype signal component is a non-linear combination of the input components. As discussed further below, a component-based linear estimator 210, then estimates the output component $\hat{d}^i(t)$.

The local prototype generator 208 can make use of synthesis techniques that offer the possibility to perform a wide range of transforms that might not otherwise be possible by using linear processing techniques alone. For example, upmixing, modification of room acoustics, and signal selection (e.g., for telephones and hearing aids) can all be accomplished using this class of synthetic processing techniques.

In some embodiments, the local prototype signal is derived based on knowledge, or an assumption, about the characteristics of the desired signal and undesired signals, as observed in the input signal space. For instance, the local prototype generator selects inputs that display the characteristics of the desired signal and inhibits inputs that do not display the desired characteristics. In this context, selection means passing with some pre-defined maximum gain, example unity, and in the limit, inhibition means passing with zero gain. Preferred selection functions may have a binary characteristic (pass region with unity gain, reject region with zero gain) or a gentle transition between passing signals with desired characteristics and rejecting signals with undesired characteristics. The selection function may include a linear combination of linearly modified inputs, one or more nonlinearly gated inputs, multiplicative combinations of inputs (of any order) and other nonlinear functions of the inputs.

In some embodiments, the synthetic prototype generator 208 generates what are effectively instantaneous (i.e., temporally local) "guesses" of signal desired at the output, without necessarily considering whether a sequence of such guesses would directly synthesize an artifact-free signal.

In some examples, approaches described in U.S. Pat. No. 7,630,500, which is incorporated by reference, that are used to compute components of an output signal are used in the present approaches to compute components of a prototype signal, which are then subject to further processing. Note that in such examples, the present approaches may differ from those described in the referenced patent in characteristics such as the time and/or frequency extent of components. For instance, in the present approach, the window "hop rate" may be higher, resulting a more temporally local synthesis of prototypes, and in some synthesis approaches, such a higher hop rate might result in more artifacts if the approaches described in the referenced patent were used directly.

Figure 4A:
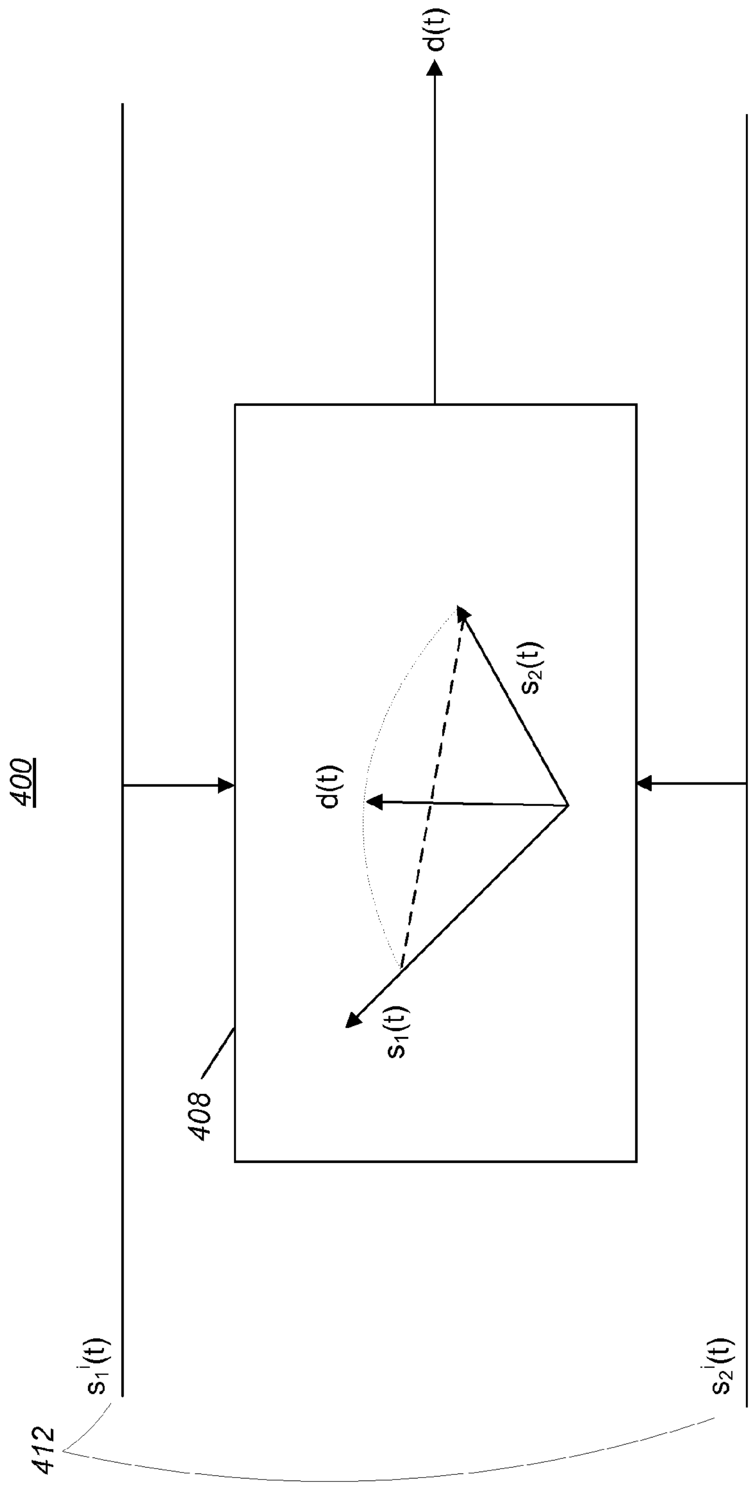
FIG. 4A is a block diagram showing an exemplary center channel synthetic prototype $d^i(t)$.

Referring to FIG. 4A, one exemplary multiple input local prototype $d^i(t)$ generator 408 (an instance of the non-linear prototype generator 208 shown in FIG. 2) for a center channel is illustrated in the complex plane for a single time value. A formula, which is applied independently for each component, defines this particular local prototype:

$$d(t) = \frac{1}{2}\left(\frac{s_1(t)}{|s_1(t)|} + \frac{s_2(t)}{|s_2(t)|}\right)\min(|s_1(t)|, |s_2(t)|)$$

where the component index i is omitted in the formula above for clarity. Note that this example is a special case of an example shown in U.S. Pat. No. 7,630,500 at equation (16), in which $\beta=\sqrt{2}/2$.

Note that the input signals 412, $s_1^i(t)$ and $s_2^i(t)$ are complex signals due to their base-band representations. The above formula indicates that the center local prototype $d^i(t)$ is the average of equal-length parts of the two complex input signals 412. In other words, of the two inputs 412, the one with the larger magnitude is scaled by a real coefficient to match the length of the smaller, and then the average of the two is taken. This local prototype signal has a selection characteristic such that its output is largest in magnitude when the two inputs 412 are in phase and equal in level, and it decreases as the level and phase differences between the signals increase. It is zero for "hard-panned" and phase-reversed left and right signals. Its phase is the average of the phase of the two input signals. Thus the vector gating function can generate a signal that has a different phase than either of the original signals, even though the components of the vector gating factor are real-valued.

Figure 5:
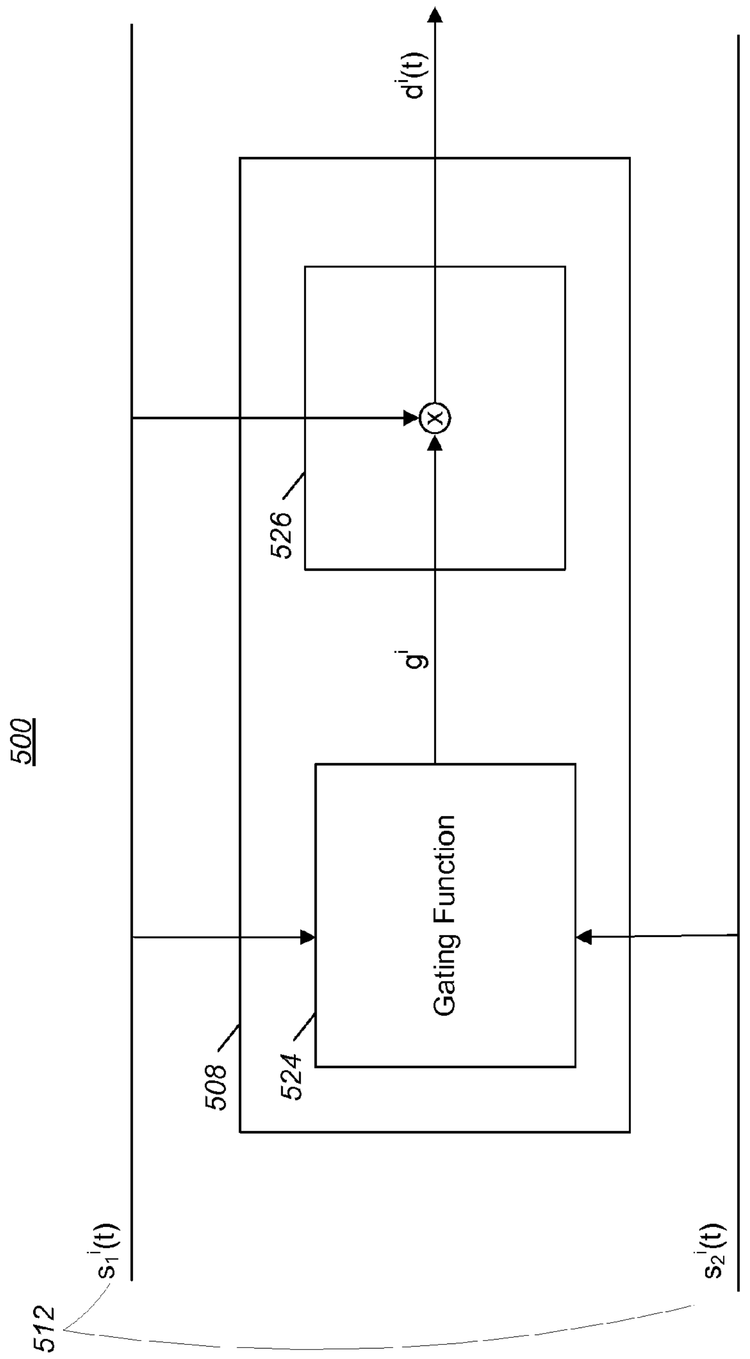
FIG. 5 is a block diagram of an alternative configuration of the synthetic processing module.

Referring to FIG. 5, another example of a prototype generation module 508 (which is another instance of the prototype generator 208 shown in FIG. 2) includes a gating function 524 and a scaler 526. The gating function 524 module accepts the input signals 512 and uses them to determine a gating factor $g^i$, which is kept constant during the analysis interval corresponding to one windowing of the input signal. The gating function module 524 may be switched between 0 and 1 based on the input signals 512. Alternatively, the gating function module 524 may implement a smooth slope, where the gating is adjusted between 0 and 1 based on the input signals 512 and/or their history over many analysis windows. One of the input signals 512, for instance $s_1^i(t)$, and gating factor g are applied to scaler 526 to yield local prototype d(t). This operation dynamically adjusts the amount of input signal 512 that is included in the output of the system. Because g is a function of $s_1$, d(t) is not a linear function of $s_1$, and is thus the local prototype is a non-linear modification of $s_1$ that has a dependency on $s_2$. Because the gating factor is real only, the local prototype, d, has the same phase as $s_1$; only its magnitude is modified. Note that the gating factor is determined on a component-by-component basis, with the gating factor for each band being adjusted from analysis window to analysis window.

One exemplary use of a gating function is for processing input from a telephone headset. The headset may include two microphones configured to be spaced apart from one another and substantially co-linear with the primary direction of acoustic propagation of the speaker's voice. The microphones provide the input signals 512 to the prototype generation module 508. The gating function module 524 analyzes the input signals 512 by, for example, observing the phase difference between the two microphones. Based on the observed difference, the gating function 524 generates a gating factor $g^i$ for each frequency component i. For example, the gating factor $g^i$ may be 0 when the phase at both microphones is equal, indicating that the recorded sound is not the speaker's voice and instead an extraneous sound from the environment. Alternatively, when the phase between the input signals 512 corresponds to the acoustic propagation delay between the microphones, the gating factor may be 1.

In general, a variety of prototype synthesis approaches may be formulated as a gating of the input signals in which the gating is according to coefficients that range from 0 to 1, which can be expressed in vector-matrix form as:

$$d(t) = \begin{pmatrix} g_1 & g_2 \end{pmatrix} \begin{pmatrix} s_1(t) \\ s_2(t) \end{pmatrix},$$

with $0 \le g_1, g_2 \le 1$.

In another example, the gating function is configured for use in a hearing assistance device in a manner similar to that described in U.S. Patent Pub. 2009/0262969, titled "Hearing Assistance Apparatus", which is incorporated herein by reference. In such a configuration, the gating function is configured to provide more emphasis to a sound source that a user is facing than a sound source that a user is not facing.

In another example, the gating function is configured for use in a sound discrimination application in which the prototype is determined in a manner similar to the way that output components are determined in U.S. Patent Pub. 2008/0317260, titled "Sound Discrimination Method and Apparatus," which is incorporated herein by reference. For example, the output of the multiplier (42), which is the product of an input and a gain (40) (i.e., gating term) in the referenced publication, is applied as a prototype in the present approaches.

4 Output Estimation

Referring back to FIG. 1, the estimator 110 is configured to determine the output $\hat{d}(t)$ that best matches a prototype d(t). In some embodiments, the estimator 110 is a linear estimator that matches d(t) in a least squares sense. Referring back to FIG. 2, for at least some forms of estimator 110, this estimate may be performed on a component by component basis because generally, the errors in each component are uncorrelated resulting from the orthogonality of the components, and therefore each component can be estimated separately. The component estimator 210 forms the estimate $\hat{d}^i(t)$ as a weighted combination $\hat{d}^i(t)=w_1 s_1^i(t)+w_2 s_2^i(t)$. The weights $w_i$ are chosen for each analysis window by a least squares weight estimator 216 to form lowest error estimate based on auto and cross power spectra of the input signals $s_1(t)$ and $s_2(t)$.

The computation implemented in some examples of the estimation module may be understood by considering a desired (complex) signal d(t) and a (complex) input signal x(t) with the goal being to find the real coefficient h such that $|d(t)-hx(t)|^2$ is minimized. The coefficient that minimizes this error can be expressed as $$h = \frac{\mathrm{Re}(E\{d(t)x^*(t)\})}{E\{x(t)x^*(t)\}} = \frac{\mathrm{Re}(S_{DX})}{S_{XX}},$$

where the exponent * represents a complex conjugate and E{ } represents an average or expectation over time. Note that numerically, the computation of h can be unstable if $E(x^2(t))$ is small, so numerically, the estimate is adjusted adding a small value to the denominator as $$h = \frac{\mathrm{Re}(S_{DX})}{S_{XX} + \epsilon}.$$

The auto-correlation $S_{XX}$ and the cross-correlation $S_{DX}$ are estimated over a time interval.

As applied to the windowed analysis illustrated in FIG. 2, (using the notation [n] to refer to the $n^{th}$ window) given a windowed input signal $x_{[n]}(t)$ (i.e., the $n^{th}$ window of an input signal x(t)), one of the $s_k$ (t), and the corresponding prototype $d_{[n]}(t)$, a local estimate of the auto and cross correlations within that window is formed as $$S_{XX}^{[n]}=\text{ave}\{|x_{[n]}(t)|^2\} \text{ and } S_{DX}^{[n]}=\text{ave}\{d_{[n]}(t)x_{[n]}^*(t)\}.$$

Note that in the case that a component can be sub-sampled to a single sample per window, these expectations may be as simple as a single complex multiplication each.

In order to obtain robust estimates of the auto- and cross-correlation coefficients, a time averaging or filtering over multiple time windows may be used. For example, one form of filter is a decaying time average computed over past windows:

$$\tilde{S}_{XX}^{[n]}=(1-a)S_{XX}^{[n]}+a\tilde{S}_{XX}^{[n-1]},$$

for example, with a equal to 0.9, which with a window hop time of 11.6 ms corresponds to an averaging time constant of approximately 100 ms. Other causal or lookahead, finite impulse response or infinite impulse response, stationary or adaptive, filters may be used. Adjustment with the factor $\epsilon$ is then applied after filtering.

Figure 6:
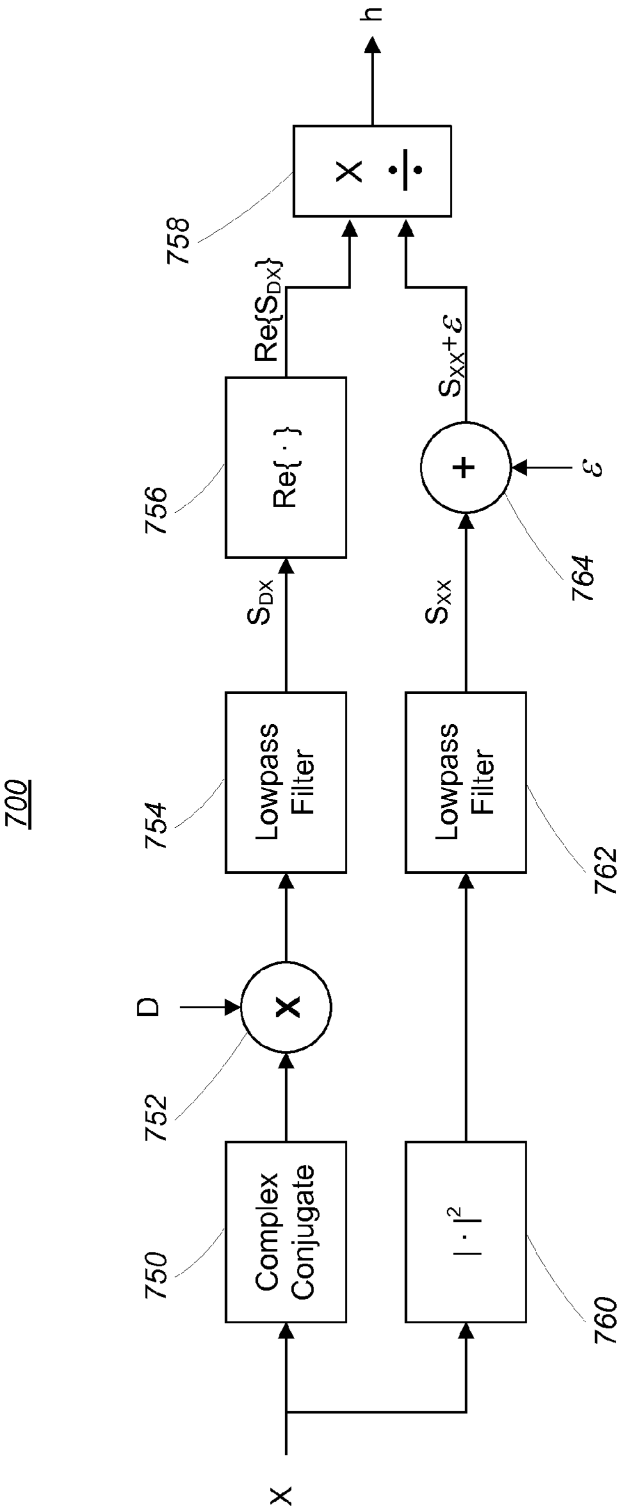
FIG. 6 is a block diagram of a system configured to determine upmixing coefficient h.

Referring to FIG. 6, one embodiment 700 of the least squares weight estimation module 216 is illustrated for the case of estimating a weight h for forming the prototype based on a single component. The component of the input is identified as X in the figure (e.g., a component $s_i(t)$ downsampled to a single sample per window), and the prototype component is identified as D in the figure. FIG. 6 represents a discrete time filtering approach that is updated once every window period. In particular, $S_{DX}$ is calculated along the top path by computing the complex conjugate 750 of X, multiplying 752 the complex conjugate of X by D, and then low-pass filtering 754 that product along the time dimension. The real part of $S_{DX}$ is then extracted. $S_{XX}$ is calculated along the bottom path by squaring the magnitude 760 of X and then low-pass filtering 762 the result along the time dimension. A small value e is then added 764 to $S_{XX}$ to prevent division by zero. Finally, h is calculated by dividing 758 $\text{Re}\{S_{DX}\}$ by $S_{XX}+\epsilon$.

The computation implemented by the estimation module may be further understood by considering a desired signal d(t) formed as combination of two inputs x(t) and y(t) with the goal being to find the real coefficients h and g such that $|d(t)-hx(t)-gy(t)|^2$ is minimized. Note that the using real coefficients is not necessary, and in alternative embodiments with complex coefficients, the formulas for the coefficient values are different (e.g., for complex coefficients, the Re( ) operation is dropped on all terms). In this case with real coefficients, the coefficients that minimize this error can be expressed as $$\begin{bmatrix} h \\ g \end{bmatrix} = \begin{bmatrix} E\{|x(t)|^2\} & \text{Re}(E\{x(t)y^*(t)\}) \\ \text{Re}(E\{y(t)x^*(t)\}) & E\{|y(t)|^2\} \end{bmatrix}^{-1} \begin{bmatrix} \text{Re}(E\{d(t)x^*(t)\}) \\ \text{Re}(E\{d(t)y^*(t)\}) \end{bmatrix}$$
$$= \begin{bmatrix} S_{XX} & \text{Re}(S_{XY}) \\ \text{Re}(S_{YX}) & S_{YY} \end{bmatrix}^{-1} \begin{bmatrix} \text{Re}(S_{DX}) \\ \text{Re}(S_{DY}) \end{bmatrix}$$

As introduced above, each of the auto- and cross-correlation terms are filtered over a range of windows and adjusted prior to computation.

The matrix formulation shown above for two channels is readily modified for any number of input channels. For example, in the case of a vector of m prototypes $\vec{d}(t)$ and a vector of n input signals $\vec{x}(t)$, a m by n matrix of weighting coefficients H may be computed to form the estimate using the vector-matrix formula $$\vec{d}(t)=H\vec{x}(t)$$

by computing the real matrix H as $$H=[Re(S_{\vec{D}\vec{X}})][Re(S_{\vec{X}\vec{X}})]^{-1}$$

where $S_{\vec{D}\vec{X}}=Re(E\{\vec{d}(t)\})$ is a $n$ by $m$ matrix and $S_{\vec{X}\vec{X}}=Re(E\{\vec{x}(t)\vec{x}^H(t)\})$ is a $n$ by $n$ matrix and $\vec{d}^H$ indicates the transpose of the complex conjugate, and the covariance terms are computed and filtered and adjusted on a component-wise basis as described above.

Figure 3A:
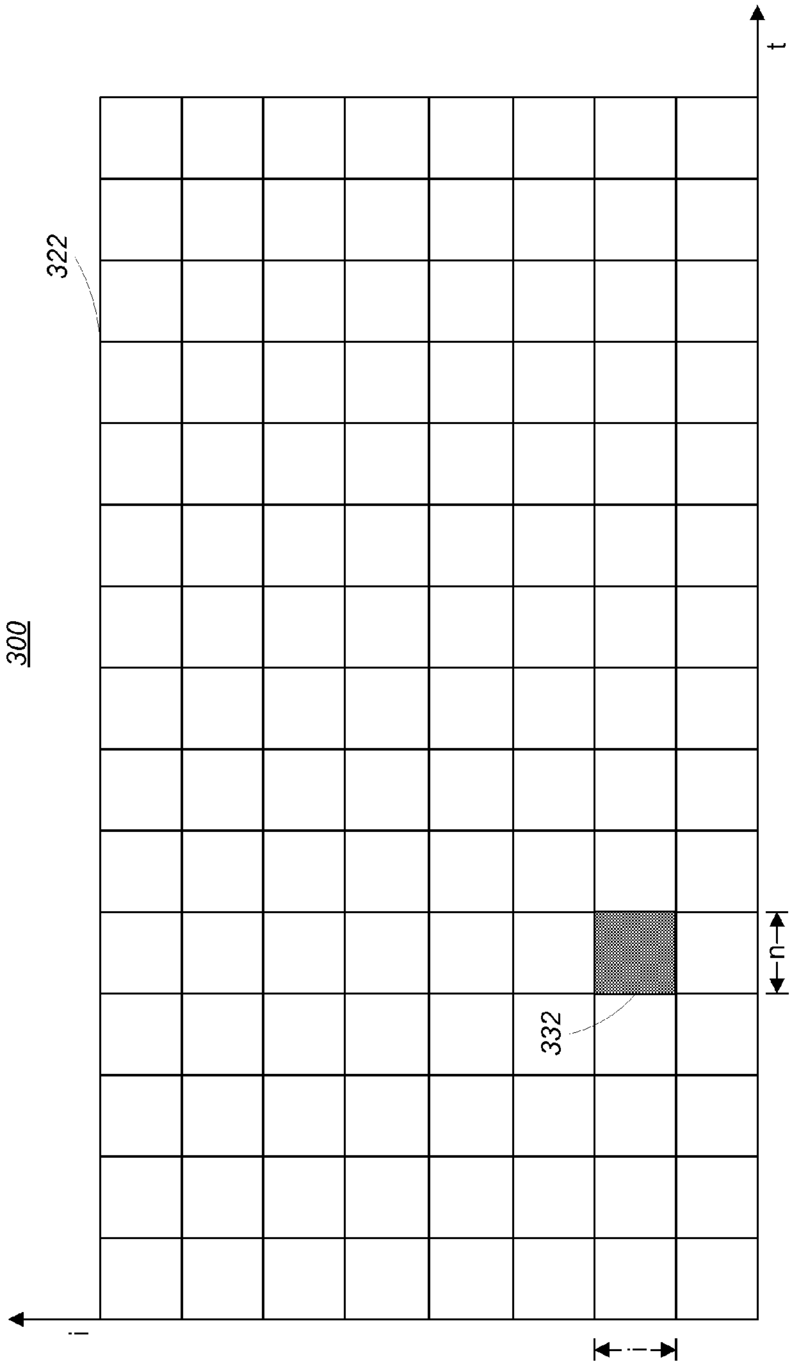
FIG. 3A shows a time-component representation for a prototype.
Figure 3B:
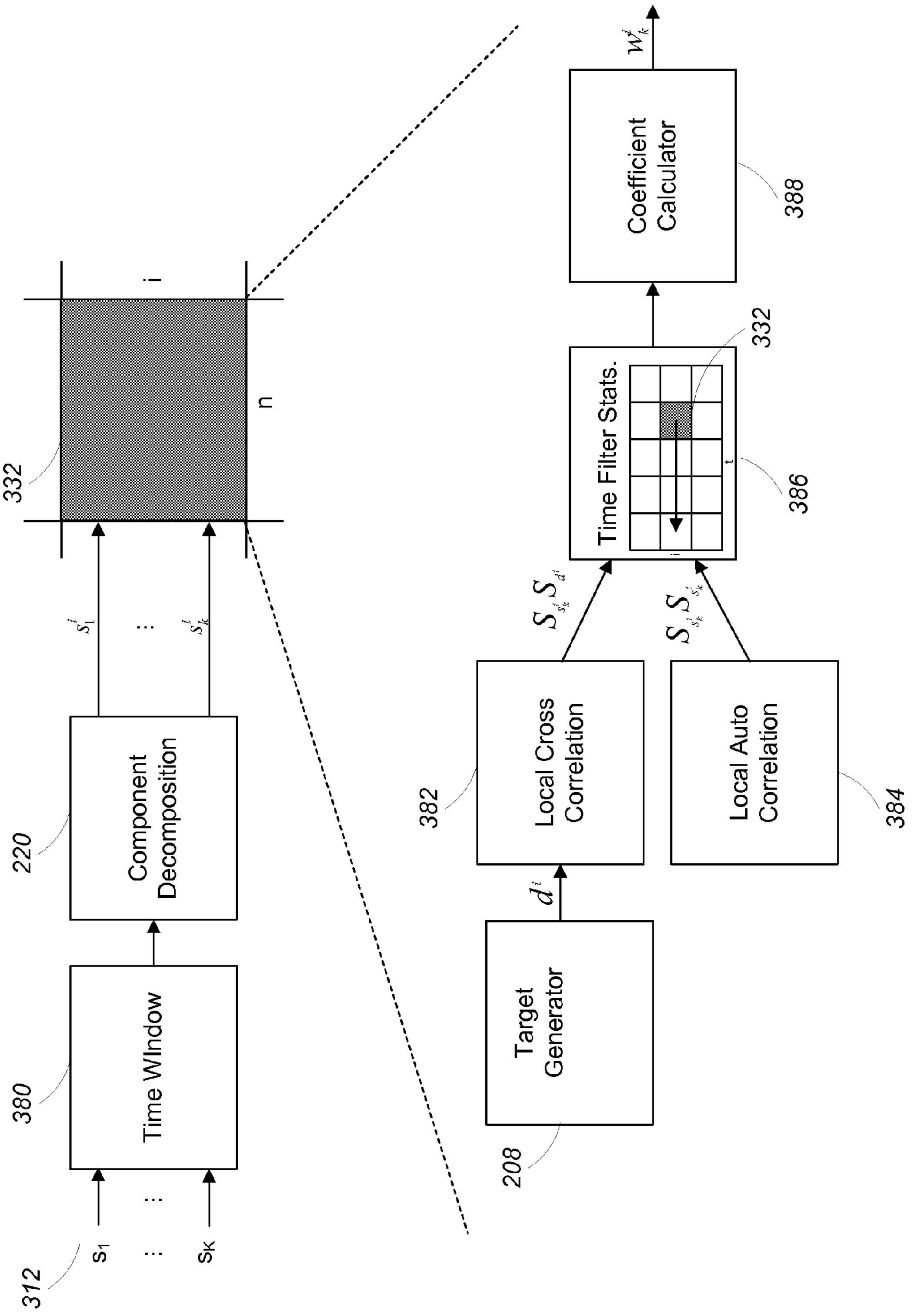
FIG. 3B is a detailed view of a single tile of the time-component representation.

FIG. 3A is a graphical representation 300 of a time-component representation 322 for all the input channels $s_k$ (t) and the one or more prototypes d(t). Each tile 332 in the representation 300 is associated with one window index n and one component index i. FIG. 3B is a detailed view of a single tile 332. In particular FIG. 3B shows that the tile 332 is created by first time windowing 380 each of the input signals 312. The time windowed section of each input signal 312 is then processed by a component decomposition module 220. For each tile 332, an estimate of the auto 384 and cross 382 correlations of the input channels 312, as well as cross correlations 382 of each of the inputs and each of the outputs is computed, and then filtered 386 over time and adjusted to preserve numerical stability. Then each of the weighting coefficients $w_k^i$ are computed according a matrix formula of the form shown above.

Note that in the description above, the smoothing of the correlation coefficients is performed over time. In some examples, the smoothing is also across components (e.g., frequency bands). Furthermore, the characteristics of the smoothing across components may not be equal, for example, with a larger frequency extent at higher frequencies than at lower frequencies.

5 Other Examples

In the examples below, for simplicity of notation, the dependence on the time variable t is omitted. Note that for some selections of analysis period $\tau$, only a single value is needed to represent the component, and therefore omitting the dependence on t can be considered as corresponding to a single (complex) value representing the analysis component. Also, in general, the weighting values are generally complex rather than real as is the case in certain examples presented above.

5.1 Multiple Dimension Input

As a first example, to summarize an approach presented above, a scalar prototype d can be estimated from n inputs x (i.e., an n column vector) by estimating a vector of n weights w (i.e., an n column vector) to satisfy:

$$\min_w E\{|d-w^T x|^2\}$$

by computing $$w = R_x^{-1}E\{dx^*\}$$

where (for $n = 2$)

$$w = [w_1, w_2]^T,$$

$$x = [x_1, x_2]^T,$$

and $$R_x = E\{xx^H\} = \begin{Bmatrix} E\{|x_1|^2\} & E\{x_1x_2^*\} \\ E\{x_2x_1^*\} & E\{|x_2|^2\} \end{Bmatrix}.$$

Therefore d is a local time-frequency estimate of a desired signal (i.e., a desired prototype) and the goal is to find the vector w such that the local weighted combination of the inputs (i.e., $w^Tx$) best fits d in a least squared error sense.

The resulting least squares estimate of d, $\hat{d}$, has a smoothing effect on d which can be perceptually pleasing to a listener. This estimate of the desired prototype, $\hat{d}=w^Tx=d+e$ (where the e term is the remaining least squares estimation error) retains the desired characteristics of d, but can be more perceptually pleasing than d alone. Furthermore, $\hat{d}$ can better retain the desired behavior of d than a simply smoothed version of d.

5.2 Multiple Input Offsets

In the previous example, a short-time implementation of the least squares solution is optionally implemented by applying low pass filters (i.e., short time expectation operators and/or cross-frequency smoothing of the statistics) to the cross and auto statistics of the closed-form solution tow. While the previous example uses the short-time implementation of the least squares solution for smoothing a single desired prototype signal, it is noted that the short-time implementation of least squares can be extended and applied to a variety of other problems (e.g., dynamic filter coefficients) by adding constraints. In particular, it can be seen as a short-time implementation of a time-varying closed form least-squares solution. This time-varying closed form least-squares solution can be applied to a variety of other situations.

In general, in the approaches described above, the prototype estimate for a frequency component i at a time frame n is assumed to depend on input signals at that same component and frame index, and possibly indirectly on other components and time frames by smoothing of the statistics used in estimation. More generally, a prototype $d_n$ at time frame n (or more precisely a prototype $d_{n,i}$ for frequency component i at time frame n; but the dependence on i is omitted for simplicity of notation) depends on inputs $x_n, \ldots, x_{n-k+1}$ over a range of k time frames n−k+1, . . . , n, and each input $x_i$ can be a vector of values that includes other frequency components than that of the prototype being estimated.

Figure 8:
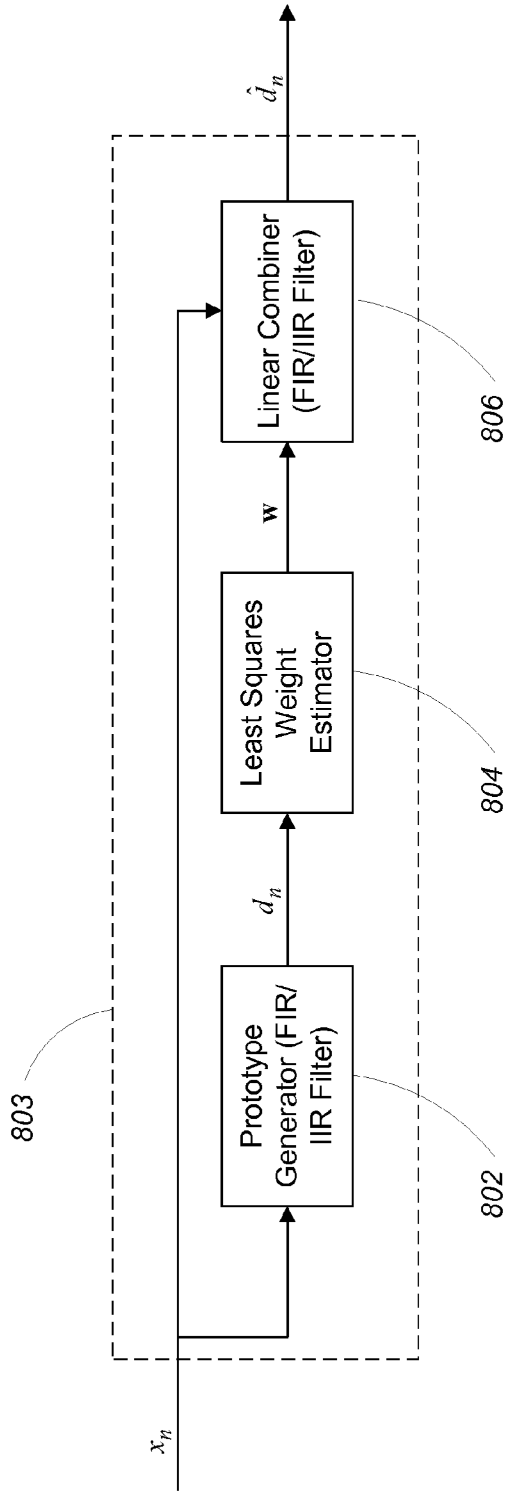
FIG. 8 is a block diagram of a system including a prototype generator that utilizes multiple past inputs and outputs.

Referring to FIG. 8, in a second example a system 800 receives an input signal $x_n$ where n is, for example, the $n^{th}$ frame of the input signal. In this example, the prototype generator 802 utilizes multiple past inputs of the input component $x_n$ or past prototype estimates $y_{n-1} \ldots y_{n-k}$ to determine the prototype signal component $d_n$ at time n. One example of a prototype generator 802 assumes $d_n$ is a weighted linear combination of past inputs and past outputs of the input component plus some estimation error, such that the prototype estimate $\hat{d}_n$ has the form of an IIR filter, as follows:

$$d_n=b_0x_n+b_1x_{n-1}+ \ldots +b_kx_{n-k} \ldots +a_1y_{n-1}+a_2y_{n-2} \ldots +a_ly_{n-l}+e_n$$

which can also be expressed as:

$$d_n=w^Tz+e_n=\hat{d}_n+e_n$$

where $$w=[w_{b_0}, w_{b_1}, \ldots, w_{b_k}, w_{a_1}, w_{a_2}, \ldots, w_{a_l}]^T$$

and $$z=[x_n, x_{n-1}, \ldots, x_{n-k}, y_{n-1}, \ldots y_{n-l}]^T.$$

The prototype signal component $d_n$ is passed to a component based linear estimator 804 (e.g., a least squares estimator) which determines the vector, w, which minimizes the difference between the prototype signal component $d_n$ and $w^Tz$ in a least squares sense as follows:

$$\min_w E\{|d_n - w^T z|^2\}$$

$$w = R_z^{-1}E\{dz^*\}$$

where $$R_z = E\{zz^H\}$$

Note that since z is a (k+l+1) column vector of input signals, $R_z$ is (k+l+1) by ( . . . k+l+1 . . . ), so that for many input signals the inversion of $R_z$ could be expensive.

The output of the component based linear estimator 804, w, is passed to a linear combination module 806 (e.g., an IIR filter) which forms the estimate $\hat{d}$ as a combination of the past input and past output values of $x_n$ in the same manner as the prototype generator 802. However, the linear combination module 806 uses the values included in the w vector in place of the $b_0, b_1, \ldots, b_k$ and $a_1, a_2, \ldots, a_l$ values (i.e., replace $b_0$ with $w_{b_0}$, $b_1$ with $w_{b_1}$, and so on). The output of the linear combination module 806, $\hat{d}_n$, is the lowest error estimate of $d_n$.

5.3 Constrained Prototype Estimates

In some examples, it is desirable to estimate multiple prototype signals from multiple input signals such that the weights used for each prototype are constrained, for example to be the same for each prototype, but applied to different input signals. As one possible example, if each prototype is a different time frame (i.e., delay) of a particular signal component, then it may be desirable that the filtering of input components at different lags be time invariant. Another example is presented in Section 5.7 below.

In general, let d be an N×1 vector of desired signals: $d=[d_0, d_1, \ldots, d_{N-1}]^T$ and let $w=[w_0, w_1, \ldots, w_{P-1}]^T$ be a P×1 vector of coefficients used to linearly combine N separate P×1 vectors of input signals. The input signals combined using w may be different for each desired prototype signal in d. Specifically, let there be a separate P×1 input vector $x_i$ (i=0, 1, . . . N−1) that corresponds to each desired signal or signal vector in $$d_0 = w^T x_0 + e_0$$

$$d_1 = w^T x_1 + e_1$$

$$\vdots$$

$$d_{N-1} = w^T x_{N-1} + e_{N-1}$$

An N×P input matrix, Z, can then be formed as:

$$Z = \begin{bmatrix} x_0^T \\ x_1^T \\ \vdots \\ x_{N-1}^T \end{bmatrix}$$

Then (noting that $d_i=w^Tx_i+e_0=x_i^Tw+e_0$) the system of equations can be rewritten as $$d=Zw+e$$

where w is a vector of weighting coefficients:

$$w=[w_0w_1, \ldots, w_{P-1}]^T$$

The closed form solution which simultaneously minimizes the difference between each of the prototype signal components d and Zw in a least squares sense as follows:

$$\min_w E\{|d-Zw|^2\}$$

$$w = E\{Z^H Z\}^{-1} E\{Z^H d\}$$

5.4 Weighted Least Squares

In the above example, each input value is effectively deemed to have the same importance in the determination of the prototype estimate by virtue of effectively minimizing the sum of the squares of the $e_i$. However, in some examples it can be useful to allow certain inputs to count more or less than other inputs. This can be accomplished using a weighted least squares solution.

The weighted least squares solution defines G as an N×N diagonal matrix of weights $g_i$ for each input $x_i$:

$$G=\text{diag}(g_1, g_2, \ldots, g_N)$$

Including this matrix in the least squares solutions described above causes an error due to a higher weighted input constraint to cost more than an error due to a lower weighted input constraint. This biases the least squares solution toward constraints with greater weights. In some examples, the constraint weights vary with time and/or frequency and can be driven by other information within a system. In other examples, there can be situations within a given frequency band where one constraint should take precedence over another, and vice versa.

The least squares solution including the matrix of weights W can be expressed as:

$$w=E\{Z^HGZ\}^{-1}E\{E\{Z^HGd\}$$

5.5 Example 1

Multichannel Inputs With a Single Local Desired Prototype

In this example, the goal is to find the linear combination of two input channel signals at time index n, $x_{1,n}$ and $x_{2,n}$, that is the best estimate $\hat{d}_n$ of the desired signal $d_n$ at time $n^n$. Thus, $$d = d_n,$$

-continued $$Z = [x_{1n}, x_{2n}], \text{ and}$$

$$w = \begin{bmatrix} w_{1n} \\ w_{2n} \end{bmatrix} = E\{Z^H Z\}^{-1} E\{Z^H d\} = E\left\{\begin{bmatrix} x_{1n} \\ x_{2n} \end{bmatrix}^* [x_{1n} \quad x_{2n}]\right\}^{-1} E\left\{\begin{bmatrix} x_{1n} \\ x_{2n} \end{bmatrix}^* d_n\right\}$$

This result is commensurate with the example presented in section 5.1.

5.6 Example 2

Single Channel, Adaptive FIR Solution With a Single Local Desired Prototype This example differs from Example 1 in that instead of using two different channels as input, two different time segments of a single channel are used as input. The goal is find the linear combination of the current (at time n) and previous (at time n−1) input signals, $x_n$ and $x_{n-1}$, that is the best estimate $\hat{d}_n$ of the desired signal $d_n$ at the current time n. Thus, $$d = d_n,$$

$$Z = [x_n, x_{n-1}]$$

and $$w = \begin{bmatrix} w_n \\ w_{n-1} \end{bmatrix} = E\{Z^H Z\}^{-1} E\{Z^H d\} = E\left\{\begin{bmatrix} x_n \\ x_{n-1} \end{bmatrix}^* [x_n \quad x_{n-1}]\right\}^{-1} E\left\{\begin{bmatrix} x_n \\ x_{n-1} \end{bmatrix}^* d_n\right\}$$

Thus, Examples 1 and 2 illustrate that it is possible to solve for the local desired signal $d_n$ by taking inputs across both channels and/or time. The dimension P, however, becomes greater than two and inverting a P×P matrix $Z^HZ$ can be expensive. Note that additional desired signals (which correspond to additional input constraints, i.e. the dimension N) can be used without increasing the size of the P×P matrix inversion.

5.7 Example 3

Multichannel Input With Constrained Prototype Estimates

In some examples, least squares smoothing is applied to a microphone array. The raw signals from the microphones in the array are used to estimate a desired source signal component at specific points in time and frequency. The goal is to determine a linear combination of the microphone signals which best approximates an instantaneous desired signal at the specific points in time and frequency. Such an application can be thought of as an extension of the application described in Example 1 above.

As is described more fully below, the least squares solution may not only provide the desired smoothing behavior to the desired signal, but can also produce coefficients which provide cancellation when the coefficients solved are complex valued.

Figure 9:
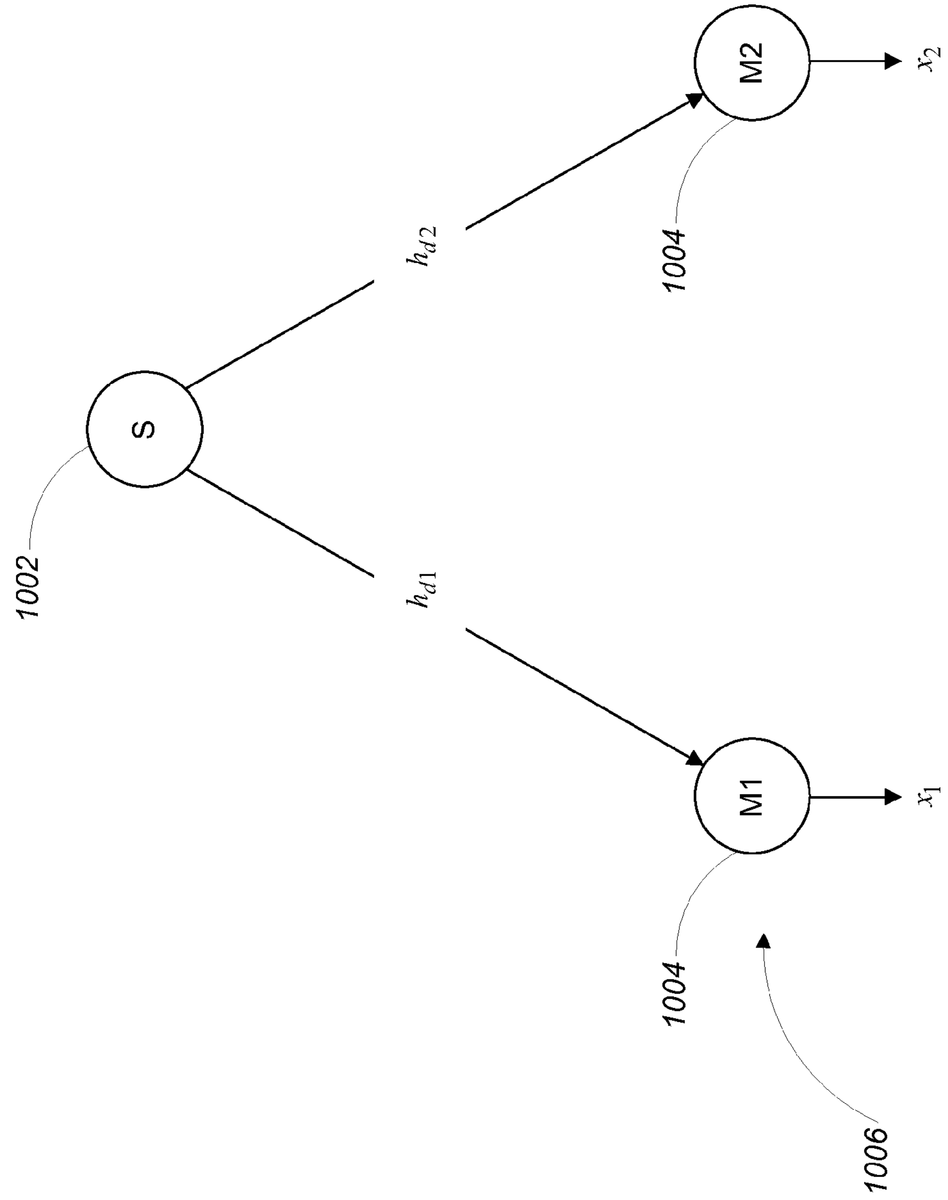
FIG. 9 is a two-microphone array receiving a source signal.

Referring to FIG. 9, a source 1002 at an ideal or known source location produces a source signal (e.g., an audio signal) which propagates through the air to each microphone 1004 of a microphone array 1006 that includes in this example two microphones, M1 and M2. As the source signal propagates from the source 1002 to each microphone 1004, it is assumed to pass through a linear transfer function $H_{dp}$ where p is the $p^{th}$ microphone 1004 in the microphone array 1006. In the discussion below, the transfer function of a particular signal component (e.g., frequency band) is referred to as $h_{dp}$.

If the geometry of the desired source 1002 location with respect to a microphone array 1006 is known, the set of transfer functions, between the ideal source location 1002 and the two microphones in the microphone array 1006 can be expressed as $$h_d=[h_{d1}, h_{d2}]^T.$$

One example of such a situation is in the case of an ear-mounted microphone array in which the location of the mouth is known (at least approximately) relative to the microphones, and therefore the transfer function may be predetermined or estimated during use.

One approach, which is not discussed further below, to processing an array of microphone signals where the transfer functions $H_{dp}$ are known could be to first estimate the source signal s and the apply this signal to prototype estimation procedures as described above.

Another preferable approach is to form the prototype estimates from the separate input signals in such a way that the weighting of the input signals approximately (but not necessarily) matches the known transfer functions from the ideal source location. In this way, a signal arriving from the ideal source location is generally passed without modification.

One way to accomplish this is to augment the prototype $d_n$ with a unit prototype $d=[d_n, 1]^T$. The unit prototype is derived from the distortionless response constraint which is used in obtaining the more commonly known Minimum Variance Distortionless Response (MVDR) solution as follows:

$$d = \begin{bmatrix} w_1 & w_2 \end{bmatrix}\begin{bmatrix} x_1 \\ x_2 \end{bmatrix} = \begin{bmatrix} w_1 & w_2 \end{bmatrix}\begin{bmatrix} h_1 \\ h_2 \end{bmatrix}s$$

To determine the weighting vector such that the weighted input signals approximately match the known transfer functions from the source, s is substituted for d in the above equation as follows:

$$s = \begin{bmatrix} w_1 & w_2 \end{bmatrix}\begin{bmatrix} h_1 \\ h_2 \end{bmatrix}s$$

resulting in the unit prototype as follows:

$$1 = \begin{bmatrix} w_1 & w_2 \end{bmatrix}\begin{bmatrix} h_1 \\ h_2 \end{bmatrix}.$$

In the context of the general least squares solution, the prototype and input matrices can then be expressed as:

$$d = [d_n, 1]^T$$

$$Z = \begin{bmatrix} x_{1n} & x_{2n} \\ h_{d1} & h_{d2} \end{bmatrix} \ldots$$

Note that the above solution combines a time invariant constraint with a time-varying solution. Thus, the additional constraint can be used to help restrain the instantaneous solution for w based on estimating $d_n$ alone from substantially harming any source signal that originated from the ideal source location. Note, however, that this is not an absolute constraint as is the case for the MVDR solution (which strictly forbids any distortion in the target source direction).

As is described above, in some examples it is desirable to have certain prototypes in the vector of prototypes, d, to have more or less effect on the estimated signal than other prototypes. This can be accomplished by including a weighting vector, G, in the solution for w. Thus the weighted solution for the example shown in FIG. 9 is as follows:

$$\begin{aligned} w &= \begin{bmatrix} w_n \\ w_{n-1} \end{bmatrix} \\ &= E\{Z^H GZ\}^{-1}E\{Z^H Gd\} \\ &= E\left\{\begin{bmatrix} x_{1n} & x_{2n} \\ h_{d1} & h_{d2} \end{bmatrix}^H \begin{bmatrix} g_1 & 0 \\ 0 & g_2 \end{bmatrix}\begin{bmatrix} x_{1n} & x_{2n} \\ h_{d1} & h_{d2} \end{bmatrix}\right\}^{-1} \\ &\quad E\left\{\begin{bmatrix} x_{1n} & x_{2n} \\ h_{d1} & h_{d2} \end{bmatrix}^H \begin{bmatrix} g_1 & 0 \\ 0 & g_2 \end{bmatrix}\begin{bmatrix} d_n \\ 1 \end{bmatrix}\right\} \end{aligned}$$

and only requires a 2×2 matrix inversion.

Figure 10:
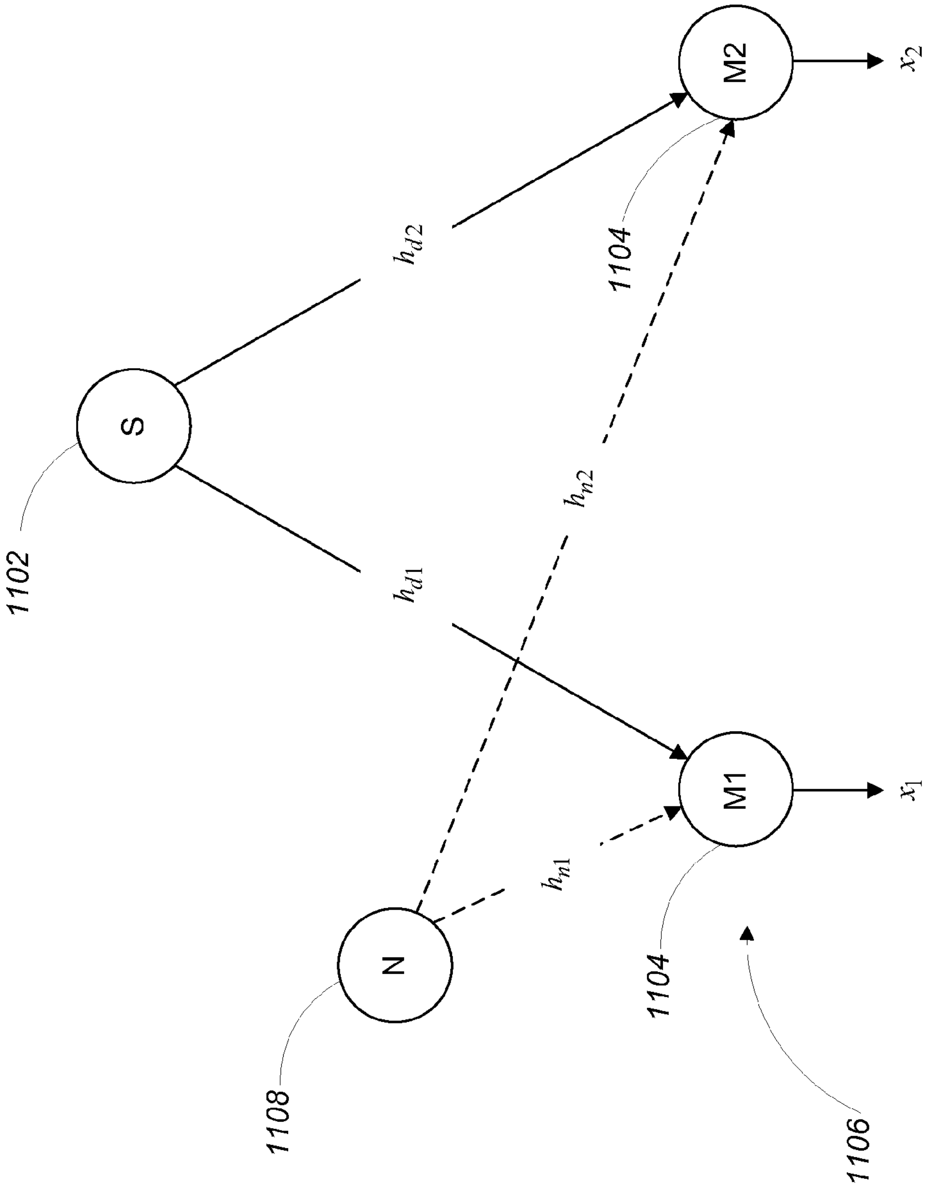
FIG. 10 is a two-microphone array receiving a source signal and a noise signal.

Referring to FIG. 10, the above example can be extended to include an additional constraint such that the instantaneous coefficients w produce a null in a particular direction with respect to the microphone array 1106. For example, the direction can be expressed as a transfer function $H_{np}$ (where p is the $p^{th}$ microphone) between a noise (or otherwise not desired) source, N 1108 at an ideal or known noise location and the P microphones 1104 in the microphone array 1106. For the discussion below, the transfer function of a signal component (e.g., a frequency band) is referred to as $h_{np}$. For the example of FIG. 10, the desired prototype vector and input matrix (for the 2 microphone elements case) can be expressed as follows:

$$d = [d_n, 1, 0]^T,$$

and $$Z = \begin{bmatrix} x_{1n} & x_{2n} \\ h_{d1} & h_{d2} \\ h_{n1} & h_{n2} \end{bmatrix}$$

The weighted solution for this example produces a tendency towards a null (i.e., an attenuation) approximately in the direction of the noise source while preserving the source signal.

While the two examples described above each involve the use of two microphones, the number of microphones can be some other number P which is greater than two. In this general case, the inputs can be expressed as:

$$x_n=h_d s_n$$

where $$h_d=[h_{d0}, h_{d1}, \ldots, h_{dP-1}].$$

Furthermore, while the examples above describe prototypes which apply to nulling and beamforming, it is noted that any other arbitrary prototypes can be used.

5.8 Example 4a

Multiple Desired Prototypes With Prototype Inputs

In another example, a two element microphone array produces raw input signals $x_1$ and $x_2$. By observing differences in the raw input signals, an instantaneous estimate of the desired signal component in each microphone, $d_1$ and $d_2$ can be obtained. These local estimates of the desired signal can be used to obtain local estimates of the noise signal from each microphone signal as follows:

$$n_1 = x_1 - d_1$$

$$n_2 = x_2 - d_2$$

In one of the examples above, the application of least squares smoothing to a microphone array was used to clean up an estimate of the desired signal. The goal of the above example was to determine a linear combination of the microphone inputs which best approximated a desired signal estimate. In this example an additional goal is to determine, at a given time-frequency point, what is the linear combination of the input signals that would best cancel a local estimate of the noise signals, while still attempting to preserve the target signal. Using the general least squares solution, the problem can be expressed as:

$$d = \begin{bmatrix} 1 \\ a \end{bmatrix}$$

$$Z = \begin{bmatrix} h_{d1} & h_{d2} \\ n_1 & n_2 \end{bmatrix}$$

Here, the top row in Z is again the transfer functions from the desired source to the array, and the desired array response in that direction is 1, while the desired response to the instantaneous noise estimate is some small signal a.

$$\begin{aligned} w &= E\{Z^H GZ\}^{-1} E\{Z^H Gd\} \\ &= E\left\{\begin{bmatrix} h_{d1} & h_{d2} \\ n_1 & n_2 \end{bmatrix}^H \begin{bmatrix} g_1 & 0 \\ 0 & g_2 \end{bmatrix} \begin{bmatrix} h_{d1} & h_{d2} \\ n_1 & n_2 \end{bmatrix}\right\}^{-1} \\ &\quad E\left\{\begin{bmatrix} h_{d1} & h_{d2} \\ n_1 & n_2 \end{bmatrix}^H \begin{bmatrix} g_1 & 0 \\ 0 & g_2 \end{bmatrix} \begin{bmatrix} 1 \\ a \end{bmatrix}\right\} \end{aligned}$$

5.9 Example 4b

Adding the Original Desired Prototype Back In

In another example, Example 4a is extended to include the original input constraint. Thus, the input matrix and desired vector are expressed as:

$$d = \begin{bmatrix} 1 \\ a \\ d_n \end{bmatrix}$$

$$Z = \begin{bmatrix} h_{d1} & h_{d2} \\ n_1 & n_2 \\ x_1 & x_2 \end{bmatrix}$$

Given that the solution for w is computed for each frequency component, the constraint weights can vary as a function of time and frequency (W=W(t, f). In some examples, it is advantageous to give more weight to certain constraints within specific frequency ranges at certain times.

It is noted that as the number of constraints being included increases, the overall formulation of a weighted, constrained least squares smoothing structure can in general be seen as an implementation strategy for incorporating multiple desired behaviors with narrow time and frequency resolution. Furthermore, in some examples it may be impossible to simultaneously obtain all of the desired behaviors due to limited degrees of freedom or conflicting requirements. However, this formulation allows the desired behaviors to be dynamically emphasized (smoothly switching or blending between constraints), while the individual constraints are smoothed in a desirable way.

5.10 Example 4c

Fixed Desired Prototypes With Dynamic Weights

In another example, both a distortionless response and noise cancellation are desired. The input matrix and desired prototype vector are expressed as:

$$d = \begin{bmatrix} 1 \\ a \end{bmatrix}$$

$$Z = \begin{bmatrix} h_{d1} & h_{d2} \\ n_1 & n_2 \end{bmatrix}$$

where a=0 or some small signal/value. In this example, the emphasis of each constraint depends on a time and/or frequency varying value. For example, a weight matrix can be defined as:

$$G_{t,f} = \begin{bmatrix} S_{t,f} & 0 \\ 0 & V_{t,f} \end{bmatrix}$$

Where, $S_{t,f}$ may function to emphasize the distortionless response constraint when the estimated target signal is present (or significant) and focus less on the distortionless response constraint when the estimated target signal is not present (or insignificant). One example of $S_{t,f}$ is $|d_n|^2$ which is an instantaneous estimate of the target signal energy. Placing $|d_n|^2$ in the weight matrix has the effect of emphasizing the distortionless response (DR) constraint when the energy of the target signal is high. Therefore, when the target signal is absent the solution focuses more on satisfying the noise cancellation constraint. $V_{t,f}$ is an arbitrary weight function on the noise cancellation constraint which may vary with time or frequency. It is noted that the dynamic weighting of constraints shown above is only one example and in general, any arbitrary function (e.g., inter-microphone coherence) can be used for dynamic weighting.

5.11 Example 5

A Fast Minimum Output Blender

In one example, two input signals are available, U and S (which like all previous examples may be multichannel time or frequency domain signals). In this example, both U and S include the same desired signal but different noise signals (i.e. $U=s+N_u$, and $S=s+N_s$). Since both the desired signal and both noise signals may be time-varying and nonstationary, it can be useful to find a local time-frequency combination of U and S (i.e. $w_U U+w_s S$ ) which includes the smallest possible noise contribution while preserving the wanted signal component that is present in both.

In this example, the desired prototypes, inputs, and weights can be expressed as:

$$d=\begin{bmatrix}0\\1\end{bmatrix}, Z=\begin{bmatrix}U & S\\1 & 1\end{bmatrix}, w=\begin{bmatrix}w_U\\w_S\end{bmatrix},$$

and the least squares solution can be expressed as:

$$\min_w E\{|d-Zw|^2\}$$

$$w=E\{Z^H GZ\}^{-1}E\{Z^H Gd\}.$$

The first constraint works to minimize the combination of U and S (or force the combination of the two to equal 0). The second constraint tries to enforce a "blending" relationship between the weights (i.e. $w_U+w_S=1$) since the target signal is the same in both U and S is therefore preserved under this constraint. G is again the diagonal weight matrix which can put more or less weight on either of the constraints. In some examples, the values in the G matrix require careful setting due to the competition between the individual constraints.

5.12 Example 5b

In another example, the weights described in Example 5a are strictly enforced to have a blender relationship where the output signal $Y=\alpha_k U+(1-\alpha_k)$ S is produced by the system. The blending factor, $\alpha_k$, can be dynamically determined as follows:

$$\min_{\alpha_k} E\left\{\left|[0]-[U_k\ S_k]\begin{bmatrix}\alpha\\1-\alpha\end{bmatrix}\right|^2\right\}$$

In this example, the cost function collapses to a scalar error function such that the derivate with respect to α can be computed. However, as in the examples above, lowpass filters are used to obtain short-time expectation operations (i.e., E { }), as in least squares smoothing, to obtain fast, local estimates of $\alpha_k$.

Figure 11:
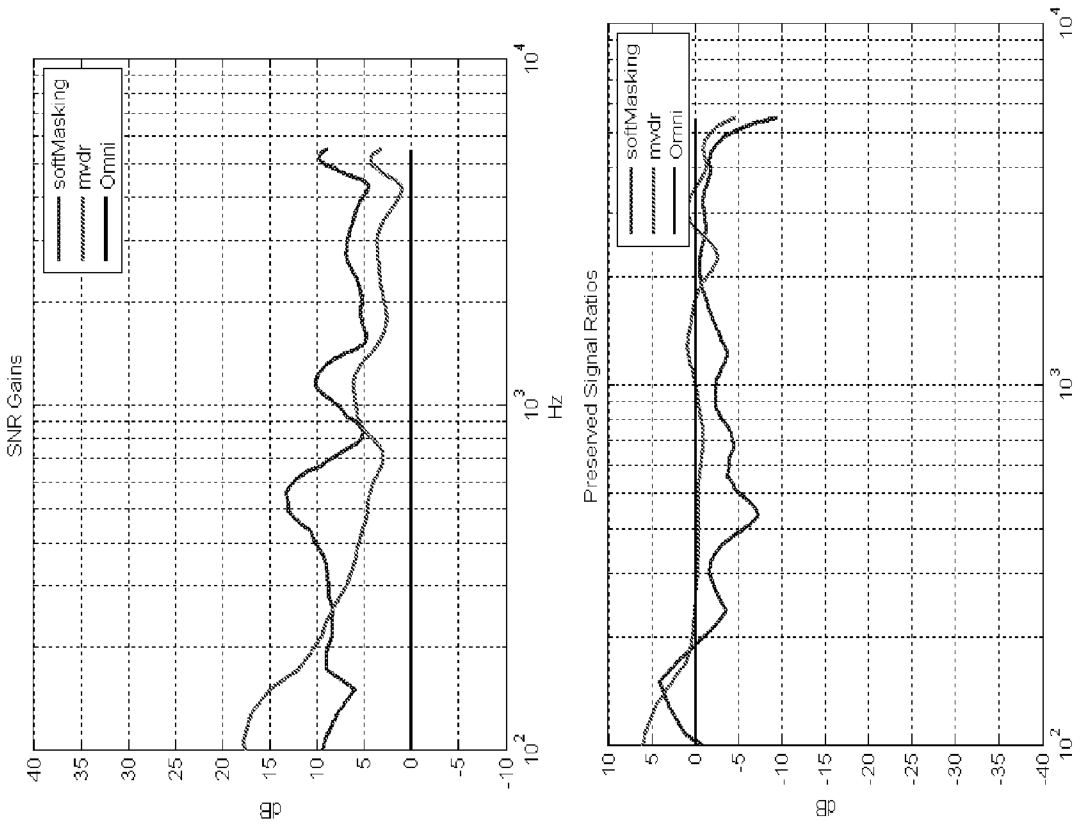
FIG. 11 is a graph of measured average Signal to Noise Ratio Gain and Preserved Signal Ratios of an MVDR design versus the a time-frequency masking scheme.
Figure 12:
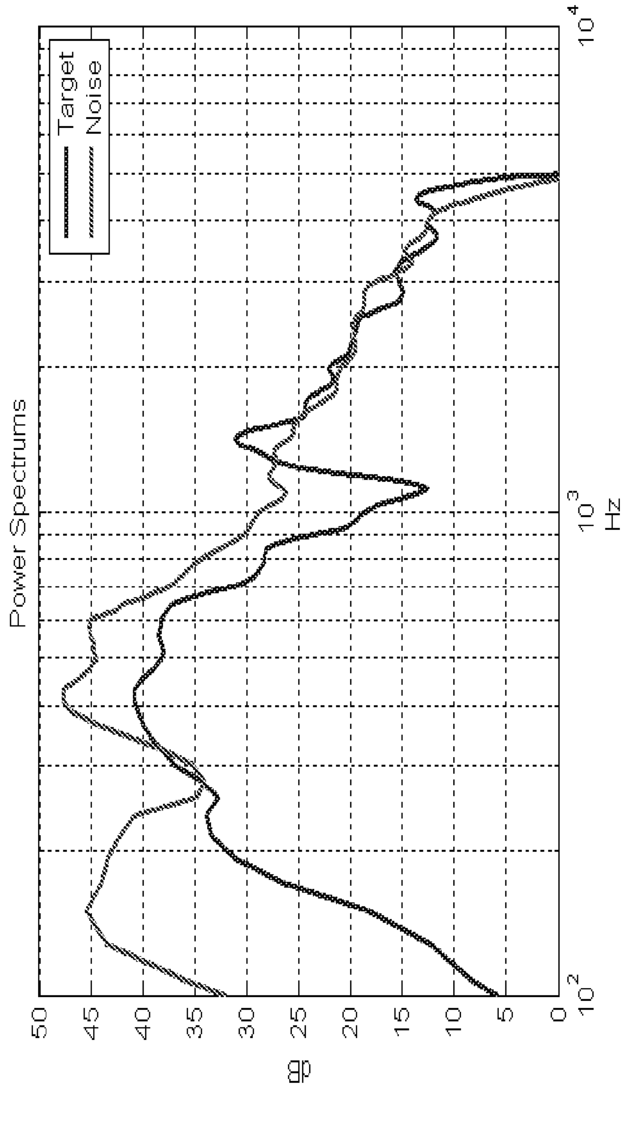
FIG. 12 is a graph of average target and noise signal power.

5.13 Experimental Results: Microphone Array Processing in Low SNR Conditions Time-frequency masking or gating schemes have the potential to outperform more well known LTI methods such as the MVDR solution under certain conditions. However, in very low SNR conditions where the target signal is seldom the dominant source, a time-frequency masking scheme tends to suppress too much of the desired signal, and may not necessarily improve the signal-to-noise ratio as well as a static spatial filter (i.e. MVDR). For a given noise environment, the optimal LTI solution results in a constant improvement in signal to noise independent of the environmental signal-to-interference ratio. FIG. 11 compares the measured average SNR Gain and Preserved Signal Ratios (PSR) of an MVDR design versus the current time-frequency masking scheme which uses complex least squares smoothing. A negative PSR in the bottom half of FIG. 11 represents on average how much of the target signal was lost (in dB) as a result of the array processing. This particular scenario includes a target speech signal in reverberated babble mixed to an overall rms SNR of −6 dB. The average target and noise signal power spectra for this experiment are shown in FIG. 12. Note that above 1.5 kHz where the local SNR is roughly 0 dB, the time-frequency masking scheme has minimal target signal loss but still a few dB of SNR gain compared to the static MVDR design. In the 400-600 Hz range where the target has significant energy on average, but the SNR is poor (~−6 dB), the time-frequency masking scheme provides up to 8 dB of SNR Gain but at the cost of more target signal loss. Below 150 Hz where the local SNR is very poor, the MVDR solution does a much better job at removing the noise compared to the time-frequency masker.

Figure 13:
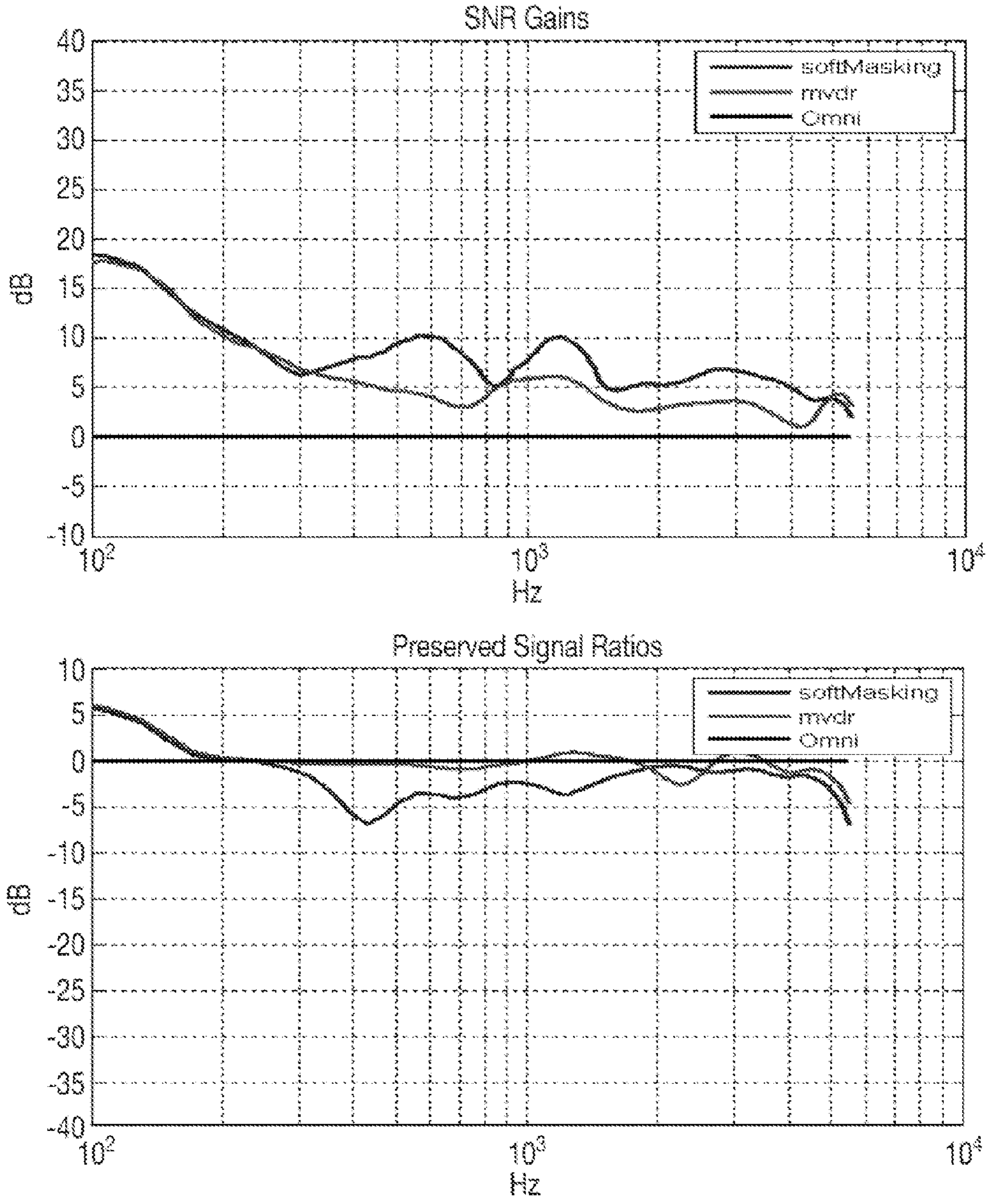
FIG. 13 is a graph of Signal to Noise Ratio Gain and Preserved Signal Ratios.

By applying additional constraints to the weighted least squares solution, as in Example 4b, it is possible to tradeoff different performance characteristics, even in the frequency ranges where each is most relevant. Furthermore, the audio quality benefits of the original least squares smoothing approach can be mostly preserved while adding this flexibility. In the following example, the constrained least squares approach was used to obtain a single solution that combines some of the strengths of both the MVDR and time-frequency masking methods. The desired vector and input matrix used were the following:

$$d=\begin{bmatrix}1\\a\\d_n\end{bmatrix}$$

$$Z=\begin{bmatrix}h_{d1} & h_{d2}\\n_1 & n_2\\x_1 & x_2\end{bmatrix}$$

where aα is some small value or signal. The first constraint applies tension towards a distortionless response for the solution in the direction of $h_d$. The second constraint drives the solutions towards suppression and cancellation of the inputs. The last constraint is the original one which drives a linear combination of the inputs to achieve the desired signal estimate obtained via time-frequency masking. In this example, weight functions were applied such that the distortionless response and input cancellation constraints dominated at low frequencies, while the time-frequency masking desired constraint dominated at higher frequencies. The SNR Gain and PSR from this experiment are given below in FIG. 13.

Figure 14:
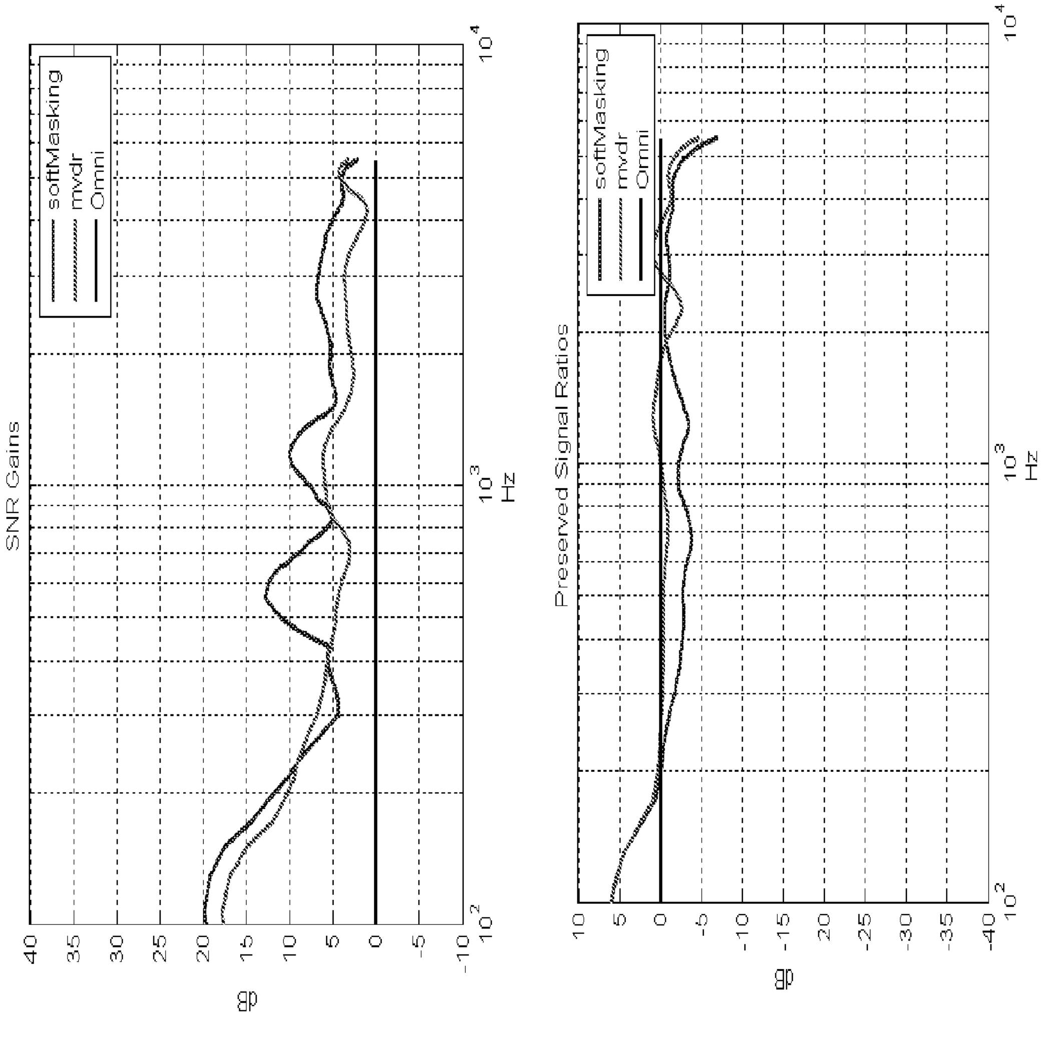
FIG. 14 is a graph of Signal to Noise Ratio Gain and Preserved Signal Ratios.

Notice that the SNR Gain benefits of the time-frequency masker are mostly preserved while also improving the SNR gain below 200 Hz to equal that of the MVDR solution. The PSR of the constrained least squares approach is only slightly improved in this case, but is at least no worse than using the time-frequency masker alone. FIG. 14 demonstrates the results using a different set of weight functions, when the distortionless response constraint is given even more emphasis at some frequencies. The SNR Gain is mostly as good as or better than the MVDR solution, but the PSR is improved over the previous example.

Figure 15:
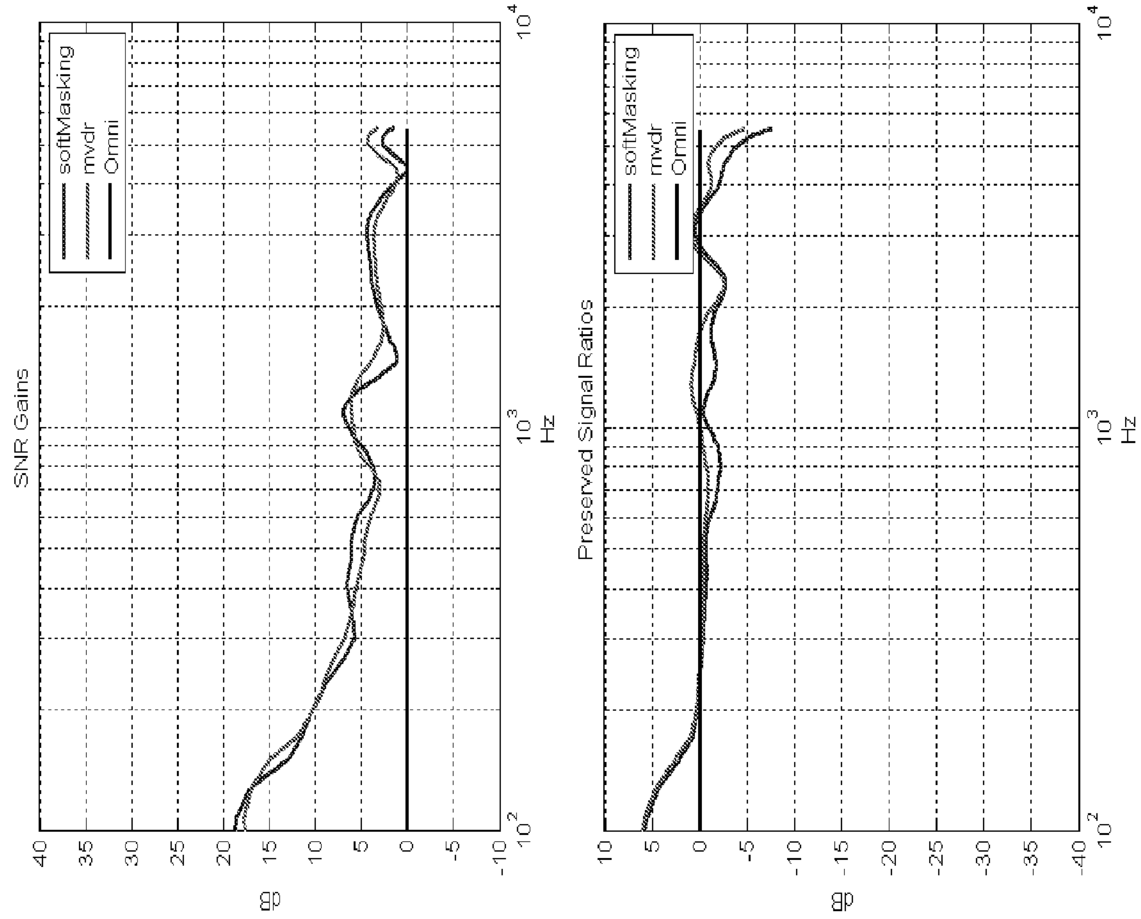
FIG. 15 is a graph of Signal to Noise Ratio Gain and Preserved Signal Ratios.

FIG. 15 demonstrates the behavior when only the first two constraints are used (i.e., unity response and cancellation) with the unit response constraint configured to dominate via the weighting matrix. The performance clearly approaches the static MVDR solution. Thus, including these additional weighted constraints in the least squares smoothing solution can provide multiple benefits. It continues to provide the desired smoothing behavior of the original least squares approach. Furthermore, for the microphone array application using time-frequency masking, it allows the array processor to trade-off different desired behaviors (via the weight functions) to produce a more optimal solution. Furthermore, because the addition of multiple constraints does not increase the size of the matrix inversion in the least squares solution, the additional processing requirements might not be considerable.

6 Component Reconstruction

Because the component decomposition module 220 (e.g. a DFT filter bank) has linear phase, the single channel upmixing outputs have the same phase and can be recombined without phase interaction, to effect various degrees of signal separation.

The component reconstruction is implemented in a component reconstruction module 230. The component reconstruction module 230 performs the inverse operation of the component decomposition module 220, creating a spatially separated time signal from a number of components 222.

7 Examples

Figure 4B:
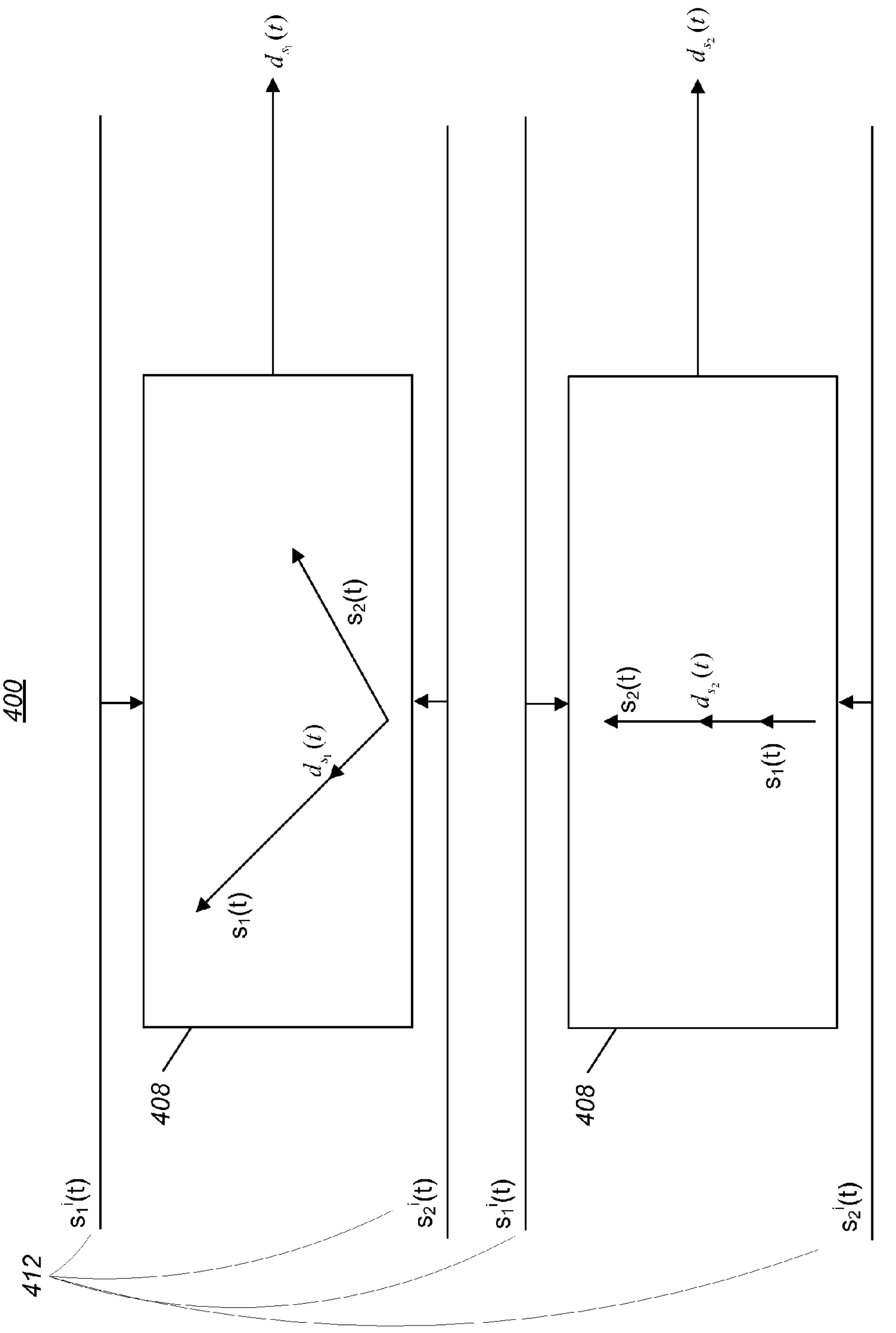
FIG. 4B is a block diagram showing two exemplary "side-only" synthetic prototypes $d^i(t)$.

In Section 3, with the input signals $s_1(t)$ and $s_2(t)$ corresponding to left, l(t), and right, r(t), signals, respectively, the prototype d(t) is suitable for a center channel, c(t). In one example, a similar approach may be applied to determine prototype signals for "left only", $l_o(t)$, and "right only", $r_o(t)$, signals. Referring to FIG. 4B, exemplary local prototypes for "side-only" channels are illustrated. Note that in other examples, local prototypes may be derived from a single channel, while in other examples they may be derived from two or more than two channels.

The following formulas define one form of such exemplary prototypes:

$$l_o(t) = l(t)\cdot\left(1 - \frac{\min(|l(t)|, |r(t)|)}{|l(t)|}\right)$$

and, $$r_o(t) = r(t)\cdot\left(1 - \frac{\min(|l(t)|, |r(t)|)}{|r(t)|}\right)$$

where the component index i is omitted in the formula above for clarity. A part of each of the input signals 412 is combined to create the center prototype. The local "side-only" prototypes are the remainder of each input signal 412 after contributing to the center channel. For example, referring to $l_o(t)$, if l(t) is smaller than r(t), the prototype is equal to zero. When l(t) is greater than r(t), the prototype has a length that is the difference in the lengths of the input signals 412, and the same direction as input l(t).

Figure 4C:
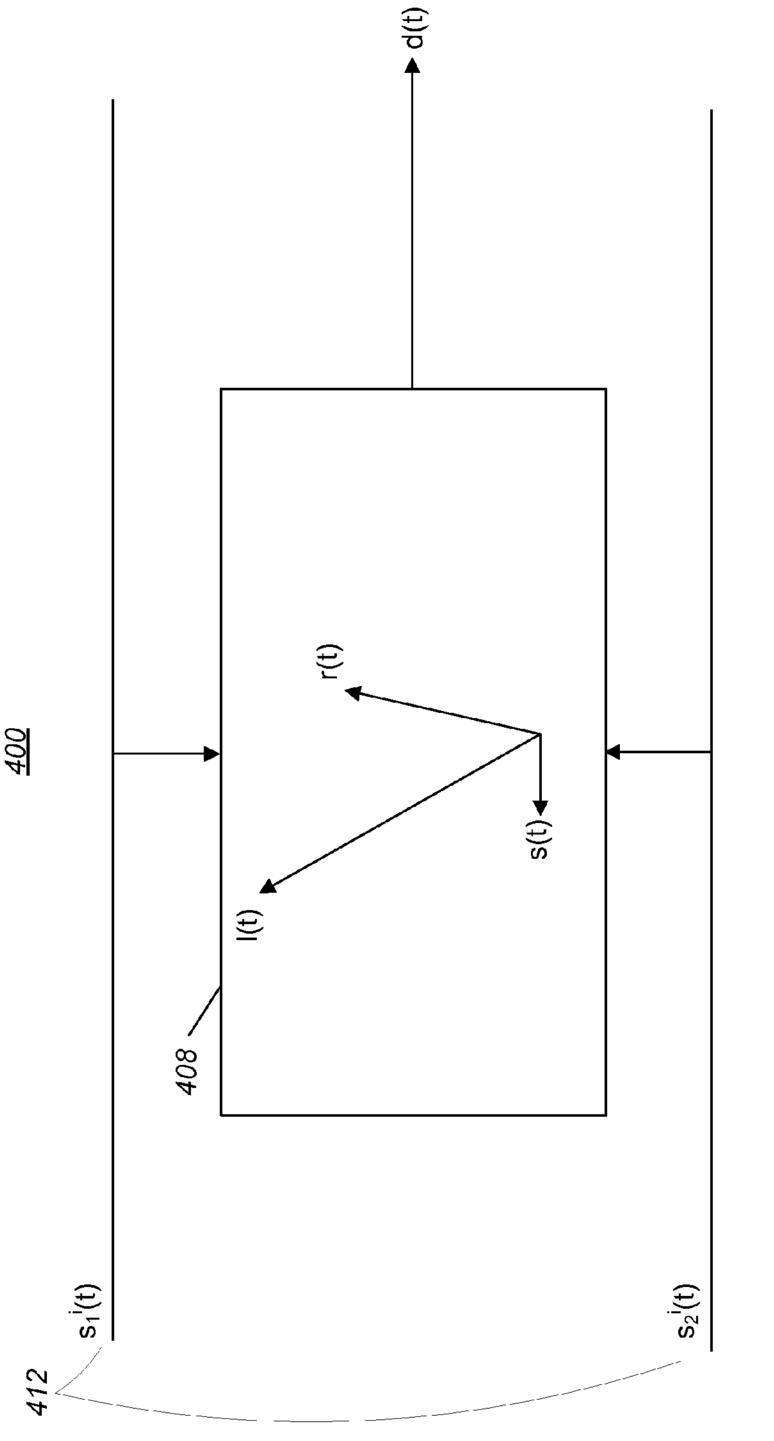
FIG. 4C is a block diagram showing an exemplary surround channel synthetic prototype $d^i(t)$.

Referring to FIG. 4C, an exemplary local prototype for a "surround" channel is illustrated. "Surround" prototypes can be used for upmixing based on difference (antiphase) information. The following formula defines the "surround" channel local prototype:

$$s(t) = \frac{1}{2}\left(\frac{l(t)}{|l(t)|} - \frac{r(t)}{|r(t)|}\right)\min(|l(t)|, |r(t)|)$$

where the component index i is omitted in the formula above for clarity. This local prototype is symmetric with the center channel local prototype. It is maximal when the input signals 412 are equal in level and out of phase, and it decreases as the level differences increase or the phase differences decrease.

Figure 7:
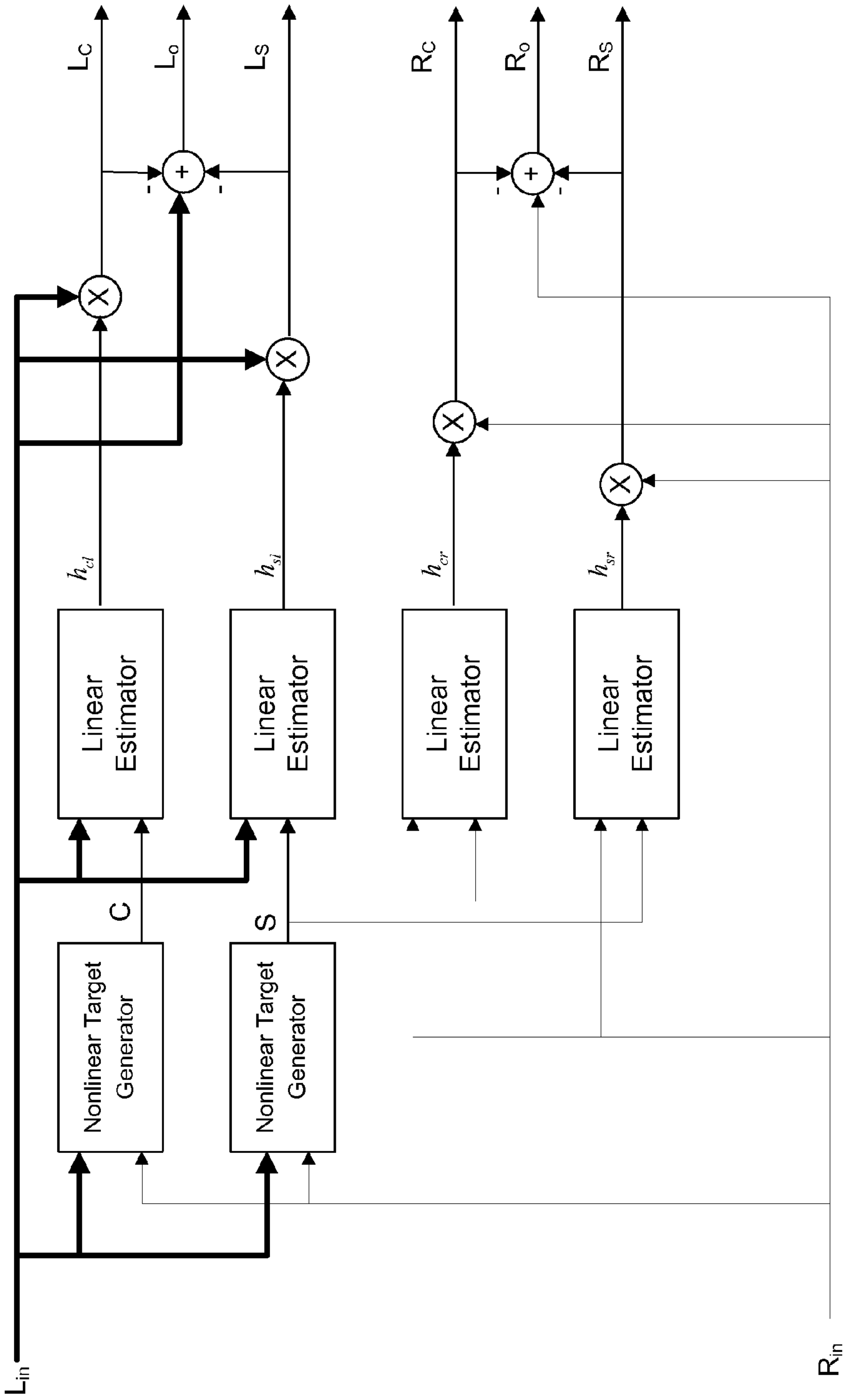
FIG. 7 is a block diagram illustrating how six upmixing channels can be determined by using two local prototypes.

Given prototype signals, for example, as described above, examples of approaches for estimating those prototype signals may differ in terms of the inputs combined to form the estimate. For instance, as illustrated in FIG. 7, the prototype d(t), referred to here as c(t) as the center channel prototype can yield two estimates, $\hat{l}_c(t)$ and $\hat{r}_c(t)$, each of which is formed as a weighting of a single input as $$\hat{l}_c(t)=h_{cl}l(t) \text{ and } \hat{r}_c(t)=h_{cr}r(t),$$

respectively, to represent the portion of the center prototype contained in the left and the right input channels, respectively. Using the definitions of the covariance and cross covariance estimates above, these coefficients are determined as follows:

$$h_{cl} = \frac{\mathrm{Re}\{S_{CL}\}}{S_{LL}};$$

and $$h_{cr} = \frac{\mathrm{Re}\{S_{CR}\}}{S_{RR}}.$$

For the definition of the surround channel, s(t), two estimates can similarly be formed as $$\hat{l}_s(t)=h_{sl}l(t) \text{ and } \hat{r}_s(t)=-h_{sr}r(t),$$

where the minus sign relates to the phase asymmetry of the surround prototype, and the coefficients being determined as $$h_{sl} = \frac{\mathrm{Re}\{S_{SL}\}}{S_{LL}};$$

and $$h_{sr} = \frac{\mathrm{Re}\{S_{SR}\}}{S_{RR}}$$

In this example, there are four upmixed channels as defined above:

$$\hat{l}_c(t), \hat{r}_c(t), \hat{l}_s(t), \text{ and } \hat{r}_s(t)$$

Two additional channels are calculated as the residual left and right signals after removing the single-channel center and surround components:

$$l_o(t)=l(t)-\hat{l}_c(t)-\hat{l}_s(t), \text{ and}$$

$$r_o(t)=r(t)-\hat{r}_c(t)-\hat{r}_s(t),$$

for a total of six output channels derived from the original two input channels.

In another example, upmixing outputs are generated by mixing both left and right input into each upmixer output. In this case, least squares is used to solve for two coefficients for each upmixer output: a left-input coefficient and a right-input coefficient. The output is generated by scaling each input with the corresponding coefficient and summing.

In this example, if the center and surround channels are approximated as:

$$\hat{c}(t)=g_{cl}l(t)+g_{cr}r(t), \text{ and } \hat{s}(t)=g_{sl}l(t)+g_{sr}r(t),$$

respectively, then the coefficients can be computed as $$H = \begin{bmatrix} g_{cr} & g_{cl} \\ g_{sr} & g_{sl} \end{bmatrix} = \left[\mathrm{Re}\left(S_{\vec{X}\vec{X}}\right)\right]^{-1}\left[\mathrm{Re}\left(S_{\vec{D}\vec{X}}\right)\right],$$

where $$\vec{x}(t) = \begin{bmatrix} r(t) \\ l(t) \end{bmatrix} \text{ and } \vec{d}(t) = \begin{bmatrix} c(t) \\ s(t) \end{bmatrix}.$$

Left-only and right-only signals are then computed by removing the components of the center and surround signals from the input signals, as introduced above. Note that in other examples, the left only and right only channels may be extracted directly rather that computing them as a remainder after subtraction of other extracted signals.

8 Alternatives

A number of example of a local prototype systhesis, for example for a center channel are presented above. However, a variety of heuristics, physical gating schemes, and signal selection algorithms could be employed to create local prototypes.

It should be understood that the prototype signals d(t), for example, as illustrated in FIG. 1 and FIG. 2, do not necessarily have to be calculated explicitly. In some examples, formulas are determined to compute the auto and cross power spectra, or other characterizations of prototype signals, that are then used in determining weights $w_k$ 217 used in an estimator 210 without actually forming the signal d(t) 209, while still yielding the same or substantially same result as would have been obtained through explicit computation of the prototype. Similarly, other forms of estimator do not necessarily use weighted input signals to form the estimated signals. Some estimators do not necessarily make use of explicitly formed prototype signals and rather use signal or data characterizing the prototypes of the target signal (e.g., using values representing statistical properties, such as auto- or cross correlation estimate, moments, etc., of the prototype) in such a way that the output of the estimator is the estimate according to the particular metric used by the estimator (e.g., a least squares error metric).

It should also be understood that in some examples, the estimation approach can be understood as a subspace projection, which the subspace is defined by the set of input signals used as the basis for the output. In some examples, the prototypes themselves are a linear function of the input signals, but may be restricted to a different subspace defined by a different subset of input signals than is used in the estimations phase.

In some examples, the prototype signals are determined using different representations than are used in the estimation. For example, the prototypes may be determined using different or no component decompositions that are not the same as the component decomposition used in the estimation phase.

It should also be understood that "local" prototypes may not necessarily be strictly limited to prototypes computed from input signals in a single component (e.g., frequency band) and a single time period (e.g., a single window of the input analysis). For instance, there may be limited used of nearby components (e.g., components that are perceptually near in time and/or frequency) while still providing relatively more locality of prototype synthesis than the locality of the estimation process.

The smoothing introduced by the windowing of the time data could be further extended to masking based time-frequency smoothing or non linear, time invariant (LTI) smoothing.

The coefficient estimation rules could be modified to enforce a constant power constraint. For instance, rather than computing residual "side-only" signals, multiple prototypes can be simultaneously estimated while preserving a total power constraints such that the total left and right signals are maintained over the sum of output channels.

Given a stereo pair of input signals, L and R, the input space may be rotated. Such a rotation could produce cleaner left only and right only spatial decompositions. For example, left-plus-right and left-minus-right could be used as input signals (input space rotated 45 degrees). More generally, the input signals may be subject to a transformation, for instance, a linear transformation, prior to prototype synthesis and/or output estimation.

9 Applications

The method described in this application can be applied in a variety of applications where input signals need to be spatially separated in a low latency and low artifact manner.

The method could be applied to stereo systems such as home theater surround sound systems or automobile surround sound systems. For instance, the two channel stereo signals from a compact disc player could be spatially separated to a number of channels in an automobile.

The described method could also be used in telecommunication applications such as telephone headsets. For example, the method could be used to null unwanted ambient sound from the microphone input of a wireless headset.

10 Implementations

Examples of the approaches described above may be implemented in software, in hardware, or in a combination of hardware and software. The software may include a computer readable medium (e.g., disk or solid state memory) that holds instructions for causing a computer processor (e.g., a general purpose processor, digital signal processor, tec.) to perform the steps described above. In some examples, the approaches are embodied in a sound processor device which is suitable (e.g., configurable) for integration into one or more types of systems (e.g., home audio, headset, etc.)

It is to be understood that the foregoing description is intended to illustrate and not to limit the scope of the invention, which is defined by the scope of the appended claims. Other embodiments are within the scope of the following claims.

What is claimed is:

1. A method comprising:

using a component analyzer to decompose input signals into input signal components representing different frequency components at each of a series of times;

using a prototype generator to determine a characterization of one or more prototype signals from the input signals, the characterization of the one or more prototype signals comprising a plurality of prototype components representing different frequency components at each of the series of times; and using an estimator, executed by a sound processing device, to process a prototype signal of the one or more prototype signals to form an output signal as an estimate of the prototype signal, the estimate being based on, and varying in accordance with, the input signals used to determine a characterization of the prototype signal, the output signal corresponding to a combination of the input signals used to determine the characterization of the prototype signal;

wherein forming the output signal as an estimate of the prototype signal comprises determining a minimum error estimate of the prototype signal.

2. The method of claim 1 wherein forming the output signal as an estimate of the prototype signal comprises, for each of the prototype components, forming an estimate based on a combination of multiple of the input signal components, including at least some input signal components at a different time or a different frequency than the prototype component being estimated.

3. The method of claim 2 wherein the combination of one or more of the input signals comprises one or more input signals at times corresponding to each of the series of times.

4. The method of claim 2 wherein forming the estimate based on a combination of multiple of the input signal components comprises forming a combination of one or more input signal components at a plurality of times preceding each of the series of times for which the output signals are formed.

5. The method of claim 1 wherein forming the output signal as an estimate of the prototype signal comprises applying one or more constraints in forming the output signal.

6. The method of claim 1 further comprising accepting the input signals from a microphone array.

7. The method of claim 6 further comprising forming the one or more prototype signals according to differences among the input signals;

wherein forming a prototype signal according to differences among the input signals comprises determining a gating value according to gain and/or phase differences and applying the gating value to the input signals to determine the prototype signal.

8. The method of claim 6 wherein forming the output signal comprises forming an estimate of the prototype signal according to at least one of a characterization of a response to a desired signal or a characterization of an undesired signal in the input signals from the microphone array.

9. The method of claim 8 wherein the characterization of the response to the desired signal or the characterization of the undesired signal comprises transfer function characteristics for a corresponding signal.

10. The method of claim 1 wherein determining the characterization of the one or more prototype signals comprises determining the one or more prototype signals.

11. The method of claim 1 wherein determining the characterization of the one or more prototype signals comprises determining statistical characteristics of the one or more prototype signals.

12. The method of claim 1 wherein determining the characterization of the one or more prototype signals includes determining data based on a temporally local analysis of the input signals.

13. The method of claim 1 wherein determining the characterization of the prototype signal includes a gating of one or more of the input signals.

14. The method of claim 1 wherein determining the minimum error estimate comprises determining a least-squared error estimate.

15. A method comprising:

using a component analyzer to decompose input signals into input signal components representing different frequency components at each of a series of times;

using a prototype generator to determine a characterization of one or more prototype signals from the input signals, the characterization of the one or more prototype signals comprising a plurality of prototype components representing different frequency components at each of the series of times; and using an estimator, executed by a sound processing device, to process a prototype signal of the one or more prototype signals to form an output signal as an estimate of the prototype signal, the estimate being based on, and varying in accordance with, the input signals used to determine a characterization of the prototype signal, the output signal corresponding to a combination of the input signals used to determine the characterization of the prototype signal;

wherein forming the output signal as an estimate of the prototype signal comprises computing estimates of statistics relating the prototype signal and corresponding input signals, and determining a weighting coefficient to apply to each of the corresponding input signals.

16. The method of claim 15 wherein the statistics include cross power statistics between the prototype signal and the corresponding input signals, and auto power statistics of the corresponding input signals.

17. A system comprising:

an input sound processor configured to decompose input signals into input signal components representing different frequency components at each of a series of times;

a prototype generator configured to accept the input signals and to provide a characterization of a prototype signal from the input signals, the characterization of the prototype signal comprising a plurality of prototype components representing different frequency components at each of the series of times; and an estimator configured to accept the characterization of the prototype signal and to form an output signal as an estimate of the prototype signal, the estimate being based on, and varying in accordance with, the input signals used to determine a characterization of the prototype signal, the output signal corresponding to a combination of the input signals;

wherein forming the output signal as an estimate of the prototype signal comprises determining a minimum error estimate of the prototype signal.

18. A non-transitory computer-readable medium storing instructions for causing a data processing system to perform operations comprising:

using a component analyzer to decompose input signals into input signals components representing different frequency components at each of a series of times;

using a prototype generator to determine a characterization of one or more prototype signals from the input signals, the characterization of the one or more prototype signals comprising a plurality of prototype components representing different frequency components at each of the series of times; and using an estimator, executable by a sound processing device, to process a prototype signal of the one or more prototype signals to form an output signal as an estimate of the prototype signal, the estimate being based on, and varying in accordance with, the input signals used to determine a characterization of the prototype signal, the output signal corresponding to a combination of the input signals used to determine the characterization of the prototype signal;

wherein forming the output signal as an estimate of the prototype signal comprises determining a minimum error estimate of the prototype signal.

19. An audio acquisition system comprising:

an input for receiving input signals from corresponding microphones;

an input processor configured to decompose the input signals into input signal components representing different frequency components at each of a series of times;

a prototype generator configured to accept the input signals and to provide a characterization of a prototype signal, the characterization of the prototype signal comprising a plurality of prototype components representing different frequency components at each of the series of times; and an estimator, executable by a sound processing device, to accept the characterization of the prototype signal and to perform processing to form an output signal as an estimate of the prototype signal, the estimate of the prototype signal corresponding to a combination of the input signals used to determine the characterization of the prototype signal, the estimate being based on, and varying in accordance with, the input signals used to determine the characterization of the prototype signal, wherein forming the output signal is performed according to a pattern of response of the microphones to a signal from a desired location;

wherein forming the output signal as an estimate of the prototype signal comprises determining a minimum error estimate of the prototype signal.

20. A system comprising:

an input sound processor configured to decompose input signals into input signal components representing different frequency components at each of a series of times;

a prototype generator configured to accept the input signals and to provide a characterization of a prototype signal from the input signals, the characterization of the prototype signal comprising a plurality of prototype components representing different frequency components at each of the series of times; and an estimator configured to accept the characterization of the prototype signal and to form an output signal as an estimate of the prototype signal, the estimate being based on, and varying in accordance with, the input signals used to determine the characterization of the prototype signal, the output signal corresponding to a combination of the input signals;

wherein forming the output signal as an estimate of the prototype signal comprises computing estimates of statistics relating the prototype signal and corresponding input signals, and determining a weighting coefficient to apply to each of the corresponding input signals.

21. A non-transitory computer-readable medium storing instructions for causing a data processing system to perform operations comprising:

using a component analyzer to decompose input signals into input signals components representing different frequency components at each of a series of times;

using a prototype generator to determine a characterization of one or more prototype signals from the input signals, the characterization of the one or more prototype signals comprising a plurality of prototype components representing different frequency components at each of the series of times; and using an estimator, executable by a sound processing device, to process a prototype signal of the one or more prototype signals to form an output signal as an estimate of the prototype signal, the estimate being based on, and varying in accordance with, the input signals used to determine the characterization of the prototype signal, the output signal corresponding to a combination of the input signals used to determine the characterization of the prototype signal;

wherein forming the output signal as an estimate of the prototype signal comprises computing estimates of statistics relating the prototype signal and corresponding input signals, and determining a weighting coefficient to apply to each of the corresponding input signals.

22. An audio acquisition system comprising:

an input for receiving input signals from corresponding microphones;

an input processor configured to decompose the input signals into input signal components representing different frequency components at each of a series of times;

a prototype generator configured to accept the input signals and to provide a characterization of a prototype signal, the characterization of the prototype signal comprising a plurality of prototype components representing different frequency components at each of the series of times; and an estimator, executable by a sound processing device, to accept the characterization of the prototype signal and to perform processing to form an output signal as an estimate of the prototype signal, the estimate of the prototype signal corresponding to a combination of the input signals used to determine the characterization of the prototype signal, the estimate being based on, and varying in accordance with, the input signals used to determine the characterization of the prototype signal, wherein forming the output signal is performed according to a pattern of response of the microphones to a signal from a desired location;

wherein forming the output signal as an estimate of the prototype signal comprises computing estimates of statistics relating the prototype signal and corresponding input signals, and determining a weighting coefficient to apply to each of the corresponding input signals.

* * * * *